(12) United States Patent
Richard et al.

(10) Patent No.: US 9,707,546 B2
(45) Date of Patent: Jul. 18, 2017

(54) COBALT-CONTAINING FISCHER-TROPSCH CATALYSTS, METHODS OF MAKING, AND METHODS OF CONDUCTING FISCHER-TROPSCH SYNTHESIS

(71) Applicant: Velocys Technologies Limited, Milton Park (GB)

(72) Inventors: Laura Richard, Wantage (GB); Kai Jarosch, Abingdon (GB); Heinz J. Robota, Dublin, OH (US); Daniele Leonarduzzi, Reading (GB); Diarmid Roberts, Sheffield (GB)

(73) Assignee: Velocys Technologies, Ltd., Milton Park, Abingdon (GB)

( * ) Notice: Subject to any disclaimer, the term of this patent is extended or adjusted under 35 U.S.C. 154(b) by 0 days.

(21) Appl. No.: 14/801,760

(22) Filed: Jul. 16, 2015

(65) Prior Publication Data

US 2016/0016154 A1    Jan. 21, 2016

Related U.S. Application Data

(60) Provisional application No. 62/025,486, filed on Jul. 16, 2014.

(51) Int. Cl.
| | |
|---|---|
| *B01J 23/89* | (2006.01) |
| *B01J 35/10* | (2006.01) |
| *B01J 35/00* | (2006.01) |
| *B01J 23/75* | (2006.01) |
| *B01J 19/00* | (2006.01) |
| *B01J 37/02* | (2006.01) |
| *C10G 2/00* | (2006.01) |
| *B01J 31/38* | (2006.01) |
| *B01J 31/02* | (2006.01) |
| *B01J 31/06* | (2006.01) |
| *B01J 37/08* | (2006.01) |
| *B01J 37/18* | (2006.01) |
| *B01J 21/06* | (2006.01) |

(52) U.S. Cl.
CPC ....... *B01J 23/8986* (2013.01); *B01J 19/0093* (2013.01); *B01J 21/063* (2013.01); *B01J 23/75* (2013.01); *B01J 31/0205* (2013.01); *B01J 31/06* (2013.01); *B01J 31/38* (2013.01); *B01J 35/002* (2013.01); *B01J 35/006* (2013.01); *B01J 35/10* (2013.01); *B01J 35/1019* (2013.01); *B01J 35/1038* (2013.01); *B01J 35/1061* (2013.01); *B01J 37/0203* (2013.01); *B01J 37/0205* (2013.01); *B01J 37/0207* (2013.01); *B01J 37/0209* (2013.01); *B01J 37/0213* (2013.01); *B01J 37/0219* (2013.01); *B01J 37/08* (2013.01); *B01J 37/18* (2013.01); *C10G 2/332* (2013.01); *C10G 2/333* (2013.01); *C10G 2/34* (2013.01); *B01J 2219/0086* (2013.01); *B01J 2219/00835* (2013.01)

(58) Field of Classification Search
CPC ........ B01J 37/0219; B01J 31/38; B01J 37/16; B01J 37/18; B01J 21/063; B01J 23/75; B01J 35/002; B01J 35/006; C10G 2/32; C10G 2/332
USPC ........................................ 502/159, 170, 241
See application file for complete search history.

(56) References Cited

U.S. PATENT DOCUMENTS

| | | | |
|---|---|---|---|
| 9,006,298 B2 | 4/2015 | LeViness | |
| 2010/0168259 A1 | 7/2010 | Xiao | |
| 2014/0045954 A1* | 2/2014 | LeViness | B01J 23/8913 518/715 |
| 2014/0088206 A1 | 3/2014 | Daly | |
| 2014/0318794 A1 | 10/2014 | LeViness et al. | |
| 2015/0018439 A1 | 1/2015 | Daly et al. | |
| 2015/0191401 A1* | 7/2015 | Liu | B01J 35/0006 518/715 |

FOREIGN PATENT DOCUMENTS

FR    2992236 A1    12/2013

OTHER PUBLICATIONS

Ducreux, O., "Microstructure of Supported Cobalt Fischer-Tropsch Catalysts", Oil & Gas Science and Technology—Rev. IFP, vol. 64 (2009), No. 1, pp. 49-62.
Horvath, Anita et al., "Silica- Supported Au Nanoparticles Decorated by TiO2: Formation, Morphology, and CO Oxidation Activity", J. Phys. Chem. B 110 (2006) 15417-15425.
Karaca, Heline, "Structure and catalytic performance of Pt-promoted alumina-supported cobalt catalysts under realistic conditions of Fischer-Tropsch Synthesis", Journal of Catalysis 277 (2011) 14-26.
Katagiri, Kiyofumi et al., Low temperature crystallization of TiO2 in layer-by-layer assembled thin films formed from water-soluble Ti-complex and polycations, Colloids and Surfaces A, 231 (2008) 233-237.
Khodakov, Andrei Y. et al., "Pore Size Effects in Fischer Tropsch Synthesis over Cobalt-Supported Mesoporous Silicas", J. Catal. 206 (2002) 230-241.
Khodakov, Andrei Y. et al, "Fischer-Tropsch synthesis: Relations between structure of cobalt catalysts and their catalytic performance", Catalysis Today, Elsevier, NL, vol. 144, No. 3-4, Jun. 30, 2009.
Mayya, K. Subramanya, "Gold-Titania Core-Shell Nanoparticles by Polyelectrolyte Complexation with a Titania Precursor", Chem Mater. (2001) 33, 3833-3836.

(Continued)

*Primary Examiner* — Jafar Parsa
(74) *Attorney, Agent, or Firm* — Frank Rosenberg

(57) ABSTRACT

Catalyst compositions, methods of making catalysts, and methods of conducting Fischer-Tropsch (FT) reactions are described. It has been discovered that a combination of large crystallite size and high porosity results in catalysts and FT catalyst systems with high stability and low methane selectivity.

19 Claims, 9 Drawing Sheets

(56) References Cited

OTHER PUBLICATIONS

Ramos, M.A. et al., "Physical and chemical characterization of some silicas and silica derivatives", Powder Technology 99 (1998) 79-85.
Ting, Tan Wei, "Synthesis of High Surface Area Zirconia and Zirconia-based catalysts", Department of Chemistry, National University of Singapore, 2010.
Written Opinion from International Application No. PCT/US2015/040813 dated Oct. 20, 2015.

* cited by examiner

COBALT-CONTAINING FISCHER-TROPSCH CATALYSTS, METHODS OF MAKING, AND METHODS OF CONDUCTING FISCHER-TROPSCH SYNTHESIS

RELATED APPLICATIONS

This application claims the benefit of priority U.S. Provisional Patent Application Ser. No. 62/025,486, filed 16 Jul. 2014.

INTRODUCTION

The Fischer-Tropsch ("FT") reaction is a chemical process that converts gaseous carbon monoxide and hydrogen into liquid hydrocarbons that may be useful in applications such as fuels and/or lubricants. The FT reaction was discovered in 1925 and since that time there has been an enormous amount of effort devoted to improve the reaction. The reaction has been used industrially to make fuels and has been the subject of hundreds or thousands of academic studies. The FT reaction can be used to convert stranded gas to liquid hydrocarbons. This provides the advantage of increasing the yield of drilling operations, but it also reduces the need to flare stranded gas; thus producing hydrocarbon product while simultaneously reducing pollution and reducing the release of greenhouse gases into the atmosphere.

One of the most common catalysts for the FT reaction is cobalt, which is typically dispersed on an oxide support. In an academic paper published in 2002 (J. Catal. 206 (2002) 230-241), Khodakov et al. described the properties of FT catalysts having cobalt particles dispersed on mesoporous silicas and concluded that larger cobalt particles in large diameter pore supports are more active and have lower methane selectivity due to the higher reducibility of the larger cobalt particles. Workers at Oxford Catalysts, have previously reported that titania-modified silica supports have better stability (see WO 2012/107718) and that, in zirconia-modified silica, $CH_4$ selectivity tends to increase as the average pore size decreases (see US Patent Publication No. 2014/0045953, incorporated herein by reference).

As described below, the inventors have discovered improved catalysts, methods of making catalysts, and methods of conducting the FT reaction. The inventors have surprisingly discovered that, contrary to the teachings of the prior literature, there is no correlation of improved catalyst performance with increased pore size and instead have found that improved catalyst performance co-occurs with large Co particles disposed within a catalyst having a high porosity—independent of pore size.

SUMMARY OF INVENTION

In one aspect, the invention provides a composition, comprising: $Co_3O_4$, where the $Co_3O_4$ in the composition has an average particle size of at least 8.8 nm; and a secondary oxide; and wherein the composition has a porosity of at least 0.35. In various preferred embodiments, the composition possesses one or more of the following characteristics: an average $Co_3O_4$ particle size of at least 9.0 nm, or at least 9.4 nm; an average $Co_3O_4$ particle size of up to 15 nm, or 13 nm, or up to 11 nm, or in the range of 9.4 to 10.9 nm; a porosity of at least 0.36; a porosity of up to 0.46, or 0.43, or 0.40, or in the range of 0.36 to 0.39; a propanol dehydration activity of at least $1.5 \times 10^{-5}$, or $2.0 \times 10^{-5}$, or $2.2 \times 10^{-5}$ moles propene per gram of the composition; a propanol dehydration activity of up to $6 \times 10^{-5}$, or $4 \times 10^{-5}$, or $3.5 \times 10^{-5}$, or in the range of $2.5 \times 10^{-5}$ to $3.5 \times 10^{-5}$ mols propene desorbed per gram. In some preferred embodiments, the secondary oxide comprises: Si, Ti, Al, Mg, Zr, Zn, Hf, Y, V, Mn, Cr, Mo, W, Ce, or combinations thereof; in some embodiments, the secondary oxide comprises Si and Ti, preferably a molar ratio of Si/Ti of at least 5.0, or at least 6.0, or at least 7.0, or a molar ratio of Si/Ti of up to 21.0, or up to 16.0, or up to 13.5, or in the range of 7.0 to 12.0. Preferably, the composition comprises at least 30 mass % Co, or at least 35 mass % Co, at least 40 mass %, at least 45 mass %, or in the range of 30 to 60 mass %, or in the range of 40 to 50 mass %, or in the range 40-45 wt. % Co; and/or at least 2 mass % $TiO_2$, or at least 3 mass % $TiO_2$, or at least 4 mass % $TiO_2$, or up to 9 mass % TiO2, or up to 8%, or up to 7 mass % $TiO_2$, or $TiO_2$ loading in the range of 4-7 mass %, where $TiO_2$ is determined by measuring the amount of Ti present in the composition and then assuming that all Ti is in the form of $TiO_2$. In some embodiments, the volumetric density of Co is at least 0.3 g Co per $cm^3$, typically in a catalyst bed.

The invention also includes a Fischer-Tropsch catalyst obtained by reducing any of the compositions described herein (in the pre-reduced form, the compositions may be referred to as catalyst precursors). The invention also includes systems (such as microchannel reactor systems) comprising the compositions described herein; the systems may further be characterized by the presence of fluids and/or conditions (such as temperature or pressure) within the microchannel reactors. The solid compositions can be described in conjunction with other fluids present during synthesis or reaction; for example, in some embodiments the composition is disposed in an atmosphere containing at least 1 mol % $H_2$. Any of the methods of conducting an FT reaction may include any of the catalysts described herein.

In a related aspect, the invention comprises a composition, comprising: $Co_3O_4$, wherein the $Co_3O_4$ in the composition has an average particle diameter of at least 8.8 nm; and a secondary oxide; and a propanol dehydration activity of $1.5 \times 10^{-5}$ to $6 \times 10^{-5}$ moles propene desorbed per gram of the composition.

In some preferred embodiments, the composition is in the form of particles having a mass average diameter of 1 cm or less, or 5 mm or less, or 2 mm or less.

In another aspect, the invention comprises a method of conducting a Fischer-Tropsch reaction, comprising: passing a gas mixture comprising CO and $H_2$ in the range of $H_2$/CO between 1.1 and 2.2 (in some embodiments between 1.5 and 2.15, in some embodiments, between 1.7 and 2.0) over a Co-containing catalyst at a contact time of 500 ms or less, and converting at least 50% of the CO to products, wherein the products (prior to any separation steps) comprise 5.2% or less of methane and 90.7% or more of $C_{5+}$ compounds. In some embodiments, this method comprises a $CH_4$ selectivity of up to 5.1%, or up to 5.3%, or up to 5.9%, or a $CH_4$ selectivity of at least 4.0%, or 4.4%, or at least 4.6%, or ranges between these values such as in the range of 4.1 to 5.9% or in the range of 4.6 to 5.1%. In some embodiments, the method has a C5+ selectivity of at least 90.0%, or at least 90.7%, or at least 91.0%; or a C5+ selectivity of up to 93.0%, or up to 92.5%, or in the range of 91.1 to 92.5%. In preferred embodiments of this method, the products are obtained after conducting the Fischer-Tropsch reaction for 5000 hours without regeneration of the catalyst.

In another aspect, the invention provides a method of making a FT catalyst or catalyst support precursor, comprising: treating a porous oxide with a solution or dispersion comprising a titanium-containing compound and a polyelectrolyte to form a catalyst support precursor. Preferably, this method comprises depositing a cobalt, iron, and/or ruthenium from a precursor composition to obtain cobalt, iron, and/or ruthenium on the surface of the porous oxide. The method may further include a step of reducing the cobalt, iron, and/or ruthenium to form an FT catalyst. The porous oxide can be treated with an organic acid prior to the step of treating the porous oxide with a solution or dispersion comprising a titanium-containing compound and a polyelectrolyte. In some embodiments, the polyelectrolyte comprises one or more of the following: polylactic acid, polyacrylic acid or other acrylic polymers for example poly(2-ethylacrylic acid), poly(2-propylacrylic acid), poly(methacrylic acid), poly(allyl methacrylate) and other polymethacrylates, maleic acid or anhydride based copolymers, for example, poly(methyl vinyl ether-alt-maleic acid), poly(ethylene-alt-maleic anhydride). In some embodiments, the porous oxide comprises silica and the precursor composition comprises cobalt. In some embodiments, the titanium-containing compound comprises titanium bis(ammonium lactate) dihydroxide TALH.

In a further aspect, the invention provides a FT reaction system comprising: a reactant stream comprising CO and $H_2$ in the range of $H_2$/CO between 1.1 and 2.2 (in some embodiments between 1.5 and 2.15, in some embodiments, between 1.7 and 2.0); a reactor comprising a catalyst comprising: $Co_3O_4$, wherein the $Co_3O_4$ in the catalyst has an average particle diameter of at least 8.8 nm, and a secondary oxide; wherein the catalyst has a porosity of at least 0.30 (or at least 0.35); and a product stream comprising 5.2% or less of methane and 90.7% or more of $C_{5+}$ compounds. This system may comprise from 1 to 5.2% methane. As used throughout this description, a "system" is a collection of physical components that includes a reactor and a catalyst, typically including reactant and/or product streams, and may be further characterized by conditions such as temperature and/or pressure, flow rates, etc.

In another aspect, the invention provides a method of making a titania-modified silica support in which the addition of the titania precursor is modified by the presence of a polyelectrolyte. This means a stable catalyst can be achieved at lower titania loadings when a polyelectrolyte is used, leading to higher catalyst pore volumes and lower methane selectivity during Fischer-Tropsch synthesis (FTS).

The present invention also provides a Fischer-Tropsch catalyst which, when tested according to the fixed bed reactor test described herein, has a methane selectivity of 6.5% or less and a $C_{5+}$ selectivity of 90.0% or more in a fixed-bed reactor, wherein the CO conversion is greater than 70%.

The present invention provides a Fischer-Tropsch catalyst which, when tested according to the single channel microchannel reactor test described herein, has a methane selectivity of 5.2% or less and a $C_{5+}$ selectivity of 90.7% or more in a microchannel reactor, wherein the CO conversion is greater than 70%. The single channel microchannel reactor test may be carried out over a reaction period of 5000 hours or more without regeneration of the catalyst, such that the contact time is less than 500 milliseconds and the CO conversion is 50% or more.

The present invention further provides the use of a catalyst or catalyst precursor as defined herein in a Fischer-Tropsch reaction.

The invention also includes any of the methods or apparatus described herein. For example, the invention includes any of the methods of making a catalyst that are described herein.

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc. In alternative embodiments, the term "comprising" can be replaced by the more restrictive phrases "consisting essentially of" or "consisting of."

For purposes of the present invention, a "catalyst" is a solid composition that heterogeneously catalyzes a reaction, preferably the Fischer-Tropsch reaction. A "catalyst precursor" is a material that may be activated to form a catalyst. The terms "catalyst" and "catalyst precursor" may be used interchangeably in this disclosure as can be understood according to the context in which they are used.

As used herein in relation to microchannel reactors, the term "contact time" refers to the volume of the reaction zone within the microchannel reactor divided by the volumetric feed flow rate of the reactant composition at a temperature of 0° C. and a pressure of one atmosphere.

The term "conversion percent" means the percent of a reactant that is consumed in a reaction.

A "microchannel" is a channel having at least one internal dimension (wall-to-wall, not counting catalyst) of 10 mm or less, preferably 2 mm or less, and greater than 1 μm (preferably greater than 10 μm), and in some embodiments 50 to 500 μm; preferably a microchannel remains within these dimensions for a length of at least 1 cm, preferably at least 20 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow through the channel. In the case of a laminated device where a microchannel has two major surfaces (for example, surfaces formed by stacked and bonded sheets), the height is the distance from major surface to major surface and width is perpendicular to height. In preferred embodiments of this invention, microchannels are straight or substantially straight—meaning that a straight unobstructed line can be drawn through the microchannel ("unobstructed" means prior to particulate loading). Typically, devices comprise multiple microchannels that share a common header and a common footer. Although some devices have a single header and single footer; a microchannel device can have multiple headers and multiple footers.

Microchannel reactors are characterized by the presence of at least one reaction channel having at least one dimension (wall-to-wall, not counting catalyst) of 1.0 cm or less, preferably 2 mm or less (in some embodiments about 1 mm or less) and greater than 100 nm (preferably greater than 1 μm), and in some embodiments 50 to 500 μm. A channel containing a catalyst is a reaction channel. More generally, a reaction channel is a channel in which a reaction occurs. Microchannel apparatus is similarly characterized, except that a catalyst-containing reaction channel is not required. Both height and width are substantially perpendicular to the direction of flow of reactants through the reactor. The sides of a microchannel are defined by reaction channel walls. These walls are preferably made of a hard material such as a ceramic, an iron based alloy such as steel, or a Ni-, Co- or Fe-based superalloy such as monel. The choice of material for the walls of the reaction channel may depend on the reaction for which the reactor is intended. In some embodiments, the reaction chamber walls are comprised of a stainless steel or Inconel® which is durable and has good thermal conductivity. Typically, reaction channel walls are formed of the material that provides the primary structural support for the microchannel apparatus. The microchannel apparatus can be made by known methods, and in some preferred embodiments are made by laminating interleaved plates (also known as "shims"), and preferably where shims designed for reaction channels are interleaved with shims designed for heat exchange. Some microchannel apparatus include at least 10 layers (or at least 100 layers) laminated in a device, where each of these layers contain at least 10 channels (or at least 100 channels); the device may contain other layers with fewer channels.

Heat exchange fluids may flow through heat transfer channels (preferably microchannels) adjacent to process channels (preferably reaction microchannels), and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange channel arrays (preferably microchannel arrays) interfaced with at least 10 layers of reaction microchannels. Each of these layers may contain simple, straight channels or channels within a layer may have more complex geometries.

"Tap density" is routinely measured by commercially available apparatus and such values are typically sufficient. A precise definition is that tap density is determined according to the procedures of ASTM D7481-09 (i.e., D7481 approved or reapproved in 2009): Standard Methods for determining loose and tapped bulk densities of powders using a graduated cylinder. Specifically, in this invention, the tap density can be measured as follows, the weight of an empty 5 mL cylinder is first measured. The catalyst sample is added to the measuring cylinder until it reaches the 5 mL mark. The weight of the filled cylinder is remeasured and securely fastened to the Autotap (or equivalent) tap density machine. The volume is remeasured after 1,500 taps. The density is calculated by dividing the weight of catalyst in grams by the volume in mL after 1,500 taps.

"Porosity"=$\rho \times V_{TOTAL}$, where $\rho$ is the tap density of the catalyst or catalyst precursor and $V_{TOTAL}$ is the total pore volume per gram of the catalyst or catalyst precursor measured using the method described at the end of the Examples section. This formula is for catalyst or catalyst precursor in the particulate form; and all aspects of the invention can, in some preferred embodiments be defined in the particulate form (for example, any of the claimed inventions can be limited to "comprising" or "consisting essentially of" catalyst or catalyst precursor in the particulate form. In some embodiments, the catalyst or catalyst precursor can be defined as comprising at least 10 mass %, or at least 50 mass %, or at least 90 mass % or 100% of the catalyst or catalyst precursor being in the particulate form. The meaning of "particles" (also known as "particulates") is well known to chemists. In the context of the present invention, particles flow under the force of gravity and provide meaningful data when measuring tap density according to the methods described here. In an alternative embodiment, total pore volume can be calculated from the BJH method. However, since the total pore volume data used to calculate porosity described here is based on the method described at the end of the Examples section, that is the method used in describing the invention, unless specified otherwise (i.e., unless the BJH method is specified as the method of determining $V_{total}$.

The invention also applies to catalysts or catalyst precursors in nonparticulate form. For example, the catalyst may be in the form of a monolith insert or wall coating. For nonparticulate forms, the measurement of $\rho$ is different. For nonparticulate forms, $\rho$ is measured by determining the volume of the catalyst (which does not include the volume of a nonporous support or the volume of large empty spaces such as bulk flow channels in the case of wall coatings) and measuring the mass of catalyst. In some embodiments, the catalyst or catalyst precursor is disposed on a monolith such as a honeycomb monolith, which could be ceramic (such as SiC or cordierite) or metal. In the case of porous ceramic monoliths, the ceramic material will also be penetrable by N2 and add to the measured porosity of the composite structure. For determining active catalyst volume per unit of reactor volume one would image a polished cross-section. An accurate determination of the cross-sectional area of the catalytic coating can be made with modern image analysis software. The volume then becomes area times height of the monolith. Removing catalyst coatings from monoliths is quite straightforward employing a "water freeze fracture" method. The monolith section is immersed in water, allowed to drain, then plunged into liquid nitrogen. The monolith body, having very low thermal contraction, doesn't fracture, but the water within the structure of the washcoat expands enough to overcome the adhesive forces holding it onto the monolith. This is routinely done in the analysis of automotive ceramic monoliths. For determining the effective catalyst density in a foam 1) Determine the open volume of an uncoated, statistically meaningful, piece of foam with mercury intrusion; 2) make the same measurement on a piece of coated foam, knowing accurately the mass per unit volume of coated catalyst. Determine the coating volume per unit of foam by the difference, and with it the corresponding effective density of the catalyst coating layer; 3) Make a thin, under 100 micron thick, coating equivalent of the washcoat on a large planar surface and treat thermally as with the washcoat; 4) recover the calcined thin "pseudocoat" and determine its pore volume per unit of mass; 5) Determine the porosity of the washcoat on the coated foam piece from these individual pieces of data.

In this application, the term "selectivity" of an FT product refers to the percent of a selected product among all products, based on the moles of carbon. For example, if a reaction produces 100 moles of carbon products including 4 moles of methane, then the methane selectivity is 4%. If the same reaction produces 1 mol of propene then selectivity to propene is 3%.

DETAILED DESCRIPTION OF THE INVENTION

Catalyst Metals

Figure 1:
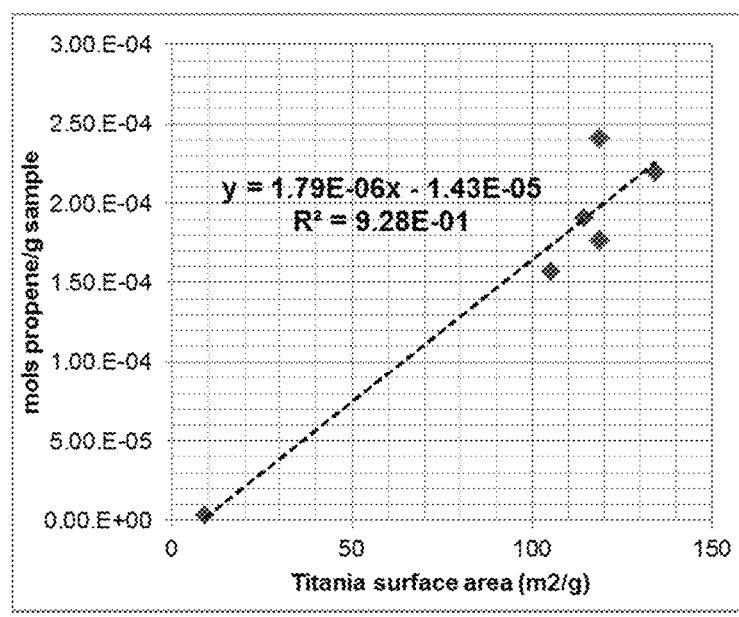
FIG. 1 is a calibration curve for titania surface area measurement, made using bulk titanias of differing surface areas.

The catalyst contains Co particles that catalyze the reaction. Preferably, the catalyst precursor has $Co_3O_4$ particles having an average particle diameter (measured as described in the Examples) of at least 8.8 nm; or of at least 9.0 nm, or at least 9.4 nm. In some embodiments, the $Co_3O_4$ articles have an average particle diameter up to 15 nm, or 13 nm, or up to 11 nm, or in the range of 9.4 to 10.9 nm. During reaction, the cobalt oxide particles are reduced, but in the presence of air (or prior to addition to a reactor), the cobalt is typically in the form of $Co_3O_4$.

The catalyst may include at least one secondary catalyst metal, such as Pd, Pt, Rh, Ru, Ir, Au, Ag and Os, transition metals, such as Zr, Ti, V, Cr, Mn, Fe, Co, Ni, Cu, Zn, Nb, Mo, Tc, Cd, Hf, Ta, W, Re, Hg and Ti and the 4f-block lanthanides, such as La, Ce, Pr, Nd, Pm, Sm, Eu, Gd, Tb, Dy, Ho, Er, Tm, Yb and Lu. Preferred secondary catalyst metals may include one or more of Pd, Pt, Ru, Ni, Fe, Cu, Mn, Mo, Re and W. In some embodiments, the catalyst contains a noble metal selected from the group consisting of Ru, Re or Pt, and most preferably Pt. In some preferred embodiments, the catalyst comprises from about 0.01 to about 1% in total of noble metal(s) (based on the total weight of the catalyst), or from about 0.015 to about 0.5% in total of noble metal(s), or from about 0.02 to about 0.3% in total of noble metal(s). In some preferred embodiments, the catalyst may comprise from 0.01 to 10% in total of other metal(s) (based on the total weight of the catalyst), or from 0.1 to 5% in total of other metals, or about 3% in total of other metals.

Oxide Supports

The catalysts have a mixture of Co combined with an oxide material of at least one other metal or semimetal. Nonlimiting examples of the oxide material include alumina, silica, titania, zirconia and zinc oxide. Preferably the catalyst (or catalyst precursor) comprises Co (or cobalt oxide) disposed on an oxide where the combined catalyst (that is, the entire composition comprising both Co and oxide material as well as any other components) has a high porosity. In preferred embodiments, the catalyst (or catalyst precursor) can be in the form of pellets, powders, rings, or other shapes such as are known in the prior art for FT catalysts. We have surprisingly discovered that superior results are obtained when the FT synthesis is catalyzed over a catalyst having large Co crystallites and high porosity. While we have demonstrated superior results for Co catalysts disposed on a mixed Si—Ti oxide, we believe that similar results could be obtained on other oxides by maintaining the Co crystallite size and porosity characteristics described in this specification, and that a variety of suitable oxides could be obtained by no more than routine experimentation in view of the descriptions in this patent specification. Thus, the invention includes compositions having the specified Co size and overall porosity where the secondary oxide comprises: Si, Ti, Al, Mg, Zr, Zn, Hf, Y, V, Mn, Ce, Cr, Mo, W, or combinations thereof.

Catalyst Characterization

The catalyst (including catalyst precursor) may be characterized by any of the properties described in the Summary and/or the Examples. For example, propanol dehydration activity, particle size, porosity, conversion and/or selectivity under the conditions specified in the Examples, and/or elemental composition.

The composition (e.g., a catalyst precursor prior to reduction) may comprise from 30 to 60% cobalt (based on the weight of the metal as a percentage of the total weight of the catalyst precursor), or from 35 to 50% of cobalt, or from 40 to 44% of cobalt. The catalyst precursor may comprise both cobalt and iron, or it may not comprise iron. The cobalt may be present as $Co_3O_4$.

The catalyst (including catalyst precursor) preferably has a porosity of at least 0.35, or at least 0.36. The catalyst (including catalyst precursor) preferably has a porosity of up to 0.46, or 0.43, or 0.40, or in the range of 0.36 to 0.39.

Methods of Making Catalyst

A method for preparing a catalyst precursor may comprise (a) depositing a solution or suspension comprising at least one Co-containing catalyst metal precursor and a complexing/reducing agent onto a modified oxide support; (b) optionally drying the modified catalyst support onto which the solution or suspension has been deposited; and (c) calcining the modified catalyst support onto which the solution or suspension has been deposited.

Suitable cobalt-containing precursors include cobalt benzoylacetonate, cobalt carbonate, cobalt cyanide, cobalt hydroxide, cobalt oxalate, cobalt oxide, cobalt nitrate, cobalt acetate, cobalt acetylacetonate and cobalt citrate. These cobalt precursors can be used individually or in combination. These cobalt precursors may be in the form of hydrates or in anhydrous form. In some cases, where the cobalt precursor is not soluble in water, such as cobalt carbonate or cobalt hydroxide, a small amount of nitric acid or a carboxylic acid may be added to enable the precursor to fully dissolve in an aqueous solution or suspension.

The catalyst metal precursor may be cobalt nitrate. Cobalt nitrate may react with a complexing/reducing agent, such as citric acid, during calcination to produce $Co_3O_4$. The citric acid may act as a complexing/reducing agent and/or as a fuel (i.e. reducing agent for cobalt nitrate) in the calcination reaction.

Suitable complexing agents for use in the method of making the catalyst precursor of the present invention are the polar organic compounds. Preferred complexing agents are urea, carboxylic acids such as acetic acid, citric acid, glycolic acid, malic acid, propionic acid, succinic acid, lactic acid and oxalic acid. Mixtures of complexing agents may also be used.

Optionally, the modified catalyst support onto which the solution or suspension has been deposited may be dried. Drying may take place at a temperature in the range from about 100° C. to about 130° C. Drying may take place in a box oven, furnace or rotary calciner. In one preferred embodiment, drying takes place by heating at a temperature that increases at a ramp rate of 2° C./min up to a temperature of 100° C. and the temperature is then held at 100° C. for about 5 hours.

The modified catalyst support onto which the solution or suspension has been deposited may be calcined, preferably at a temperature in the range from about 200° C. to about 350° C., more preferably from about 200° C. to about 250° C. Calcining may take place in a box oven, furnace or rotary calciner. In one preferred embodiment, calcining takes place by heating at a temperature that increases at a ramp rate of 2° C./min up to a final temperature of 250° C. The temperature is held at 250° C. for about 3 hours. In one preferred embodiment, calcining preferably takes place by heating at a temperature that increases at a ramp rate of 2° C./min up to a temperature of 200° C.; the temperature is held at 200° C. for about 3 hours before being increased again at a ramp rate of 1° C./min up to a temperature of 250° C. and then held at that temperature for a further 3 hours. The final temperature preferably does not exceed about 250° C. because calcining at higher temperatures may have the effect of reducing catalyst stability.

The deposition, drying and calcination steps may be repeated one or more times. For each repetition, the solution or suspension used in the deposition step may be the same or different. If the solution or suspension in each repetition is the same, the repetition of the steps allows the amount of catalyst metal(s) to be brought up to the desired level on the modified catalyst support stepwise in each repetition. If the solution or suspension in each repetition is different, the repetition of the steps allows schemes for bringing the amounts of different catalyst metals up to the desired level in a series of steps to be executed.

The catalyst precursor may contain up to 10% carbon (based on the weight of the carbon, in whatever form, in the catalyst as percentage of the total weight of the catalyst precursor), or from 0.001 to 5% of carbon, or about 0.01% of carbon. Alternatively, the catalyst precursor may comprise no carbon.

The catalyst precursor may be activated by any of the conventional activation processes. For instance, the catalyst precursor may be activated using a reducing gas, such as hydrogen, a gaseous hydrocarbon, a mixture of hydrogen and a gaseous hydrocarbon (e.g. methane), a mixture of gaseous hydrocarbons, a mixture of hydrogen and gaseous hydrocarbons, a mixture of hydrogen and nitrogen, syngas, or a mixture of syngas and hydrogen. The gas may be at a pressure of from 1 bar (atmospheric pressure) to 100 bar, or at a pressure of less than 30 bar.

The catalyst precursor may be heated to its activation temperature at a rate of from 0.01 to 20° C. per minute. The activation temperature may be no more than 600° C., or no more than 400° C. The catalyst precursor may be held at the activation temperature for from 2 to 24 hours, or from 8 to 12 hours. After activation, the catalyst may be cooled to a desired reaction temperature.

The high porosity, large $Co_3O_4$ particle size catalyst can be made by the methods described herein. Generally, stable oxide support materials are well known and catalyst synthesis conditions should avoid high calcination temperatures where the supports sinter. Large $Co_3O_4$ particles can be obtained by the methods described herein. Changing the relative amount of organic in the preparation can be used to influence $Co_3O_4$ size. Heating in air or inert gas can foster the growth of $Co_3O_4$ particles.

Methods of FT Synthesis

The catalyst, after activation, may be used in a Fischer-Tropsch process. This process may be carried out in a fixed bed reactor, a continuous stirred tank reactor, a slurry bubble column reactor or a circulating fluidized bed reactor. This process may be carried out in a microchannel reactor.

The Fischer-Tropsch process is well known and the reaction conditions can be any of those known to the person skilled in the art, for instance the conditions discussed in WO 2008/104793. For example, the Fischer-Tropsch process may be carried out at a temperature of from 150 to 300° C., or from 200 to 260° C., a pressure of from 1 to 100 bar, or from 15 to 25 bar, a $H_2$ to CO molar ratio of from 1.1 or 1.2 to 2.2 or 1.5 to 2.0 or about 1.8, and a gaseous hourly space velocity of from 200 to 5000, or from 1000 to 2000 $hr^{-1}$. In a microchannel reactor, the gaseous hourly space velocity may be from 5000 to 30000 $hr^{-1}$.

Preferably, the microchannel reactor used for the FTS process is capable of high heat flux for cooling of the process microchannels during the reaction, which may be achieved by incorporating heat exchange channels. The microchannel reactor for FTS may be designed to achieve a heat flux greater than 1 $W/cm^2$ between the reaction channels and the heat exchanger. The heat flux for convective heat exchange in the microchannel reactor may range from about 1 to about 25 watts per square centimetre of surface area of the process microchannels ($W/cm^2$) in the microchannel reactor, suitably from about 1 to about 10 $W/cm^2$. The heat flux for phase change or simultaneous endothermic reaction heat exchange may range from about 1 to about 250 $W/cm^2$, from about 1 to about 100 $W/cm^2$, from about 1 to about 50 $W/cm^2$, from about 1 to about 25 $W/cm^2$, and from about 1 to about 10 $W/cm^2$.

Examples and Description of Measurement Techniques

Methods of Making Catalysts

In a preliminary step of FT catalyst synthesis, the surface of the silica support was modified with titania. A plot of titania loading versus FTS stability in the single channel reactor for the ActOCat1100 formulation suggests a plateau in stability is reached between 12 and 16 wt. % TiO2:

On certain silicas it has been reported that 16 wt. % $TiO_2$ on silica is equivalent to a theoretical monolayer of $TiO_2$ (J. Phys. Chem. C. 102 (1998) 5653-5666), but it is not known if a uniform film of titania is actually achieved. An improvement in the dispersion of titania over the silica surface could allow the total titania loading to be decreased, which is believed to result in increased catalyst pore volume and higher $C_{5+}$ selectivity.

A method of measuring the specific titania surface area has been developed, using titania catalysis of the "isopropanol to propene conversion" around 200° C. (Srinivasan et al., J. Catal. 131 (1991) 260-275). The method involves impregnating a titania modified silica support with isopropanol and monitoring the mass of propene that is released from the support as it is heated. This can be compared to the specific reactivity of titania for the isopropanol dehydration reaction as measured for a selection of titania materials: Biaglow et al. report a value of 1.5 to $3.6 \times 10^{18}$ molecules propene/$m^2$ for titania supported on silica spheres and $0.9 \times 10^{18}$ for anatase titania (Biaglow et al., Catal. Lett. 13 (1992) 313-321); whilst 0.8 to $2.0 \times 10^{16}$ is observed from anatase titania on silica (Hansprasopwattana et al., Catal. Lett. 45 (1997) 165-175).

Several methods of producing a uniform film of titania over a porous silica support have been proposed in the literature. One method involves mixing TALH and urea, and via control of the heating regime and thus the urea decomposition, slowly hydrolysing and condensing the TALH to produce a uniform film of titania (Mat. Res. Bull. 44 (2009) 2000; Catal. Lett. 45 (1997) 165). Another method involves the sequential deposition of positively charged polyelectrolytes, e.g., poly(ethyleneimine) and then negatively charged TALH on silica, and thus producing a uniform film via electrostatic absorption over the surface. This has been demonstrated for quartz (Colloids and Surfaces A, 231 (2008) 233) and nonporous silica (Chem. Mater. 13 (2001) 3833, J. Phys. Chem. B 110 (2006) 15417), but does not yet appear to have been tested for porous catalyst supports.

In one method, (e.g. as in ActOCat1200), TALH was mixed with citric acid (CA) and impregnated onto silica. CA was replaced with polyelectrolytes, and measured changes in the properties and performance of a catalyst made on this modified support.

Preparation of Titania-Modified Supports

Table 1 lists materials that were used during preparation of modified catalyst supports:

TABLE 1

Precursors used in catalyst and support synthesis

| Chemical | Acronym | MW (g/mol) | Supplier | conc |
|---|---|---|---|---|
| Titanium bis(ammonium) lactato dihydroxide | TALH | 294 | Sigma-Aldrich | 50 wt. % in H2O |
| AGC D-60/80-200A silica | AGC | | AGC Si-Tech | n/a |
| Citric acid monohydrate | CA | 210 | Sigma-Aldrich | 99% |
| poly allyl amine | PAH | 65000 | Sigma-Aldrich | 20% in H2O |
| poly acrylic amide | PAAM | 10000 | Sigma-Aldrich | 50% in H2O |
| poly ethyleneimine | PEI | 1300 | Sigma-Aldrich | 50% |

TABLE 1-continued

Precursors used in catalyst and support synthesis

| Chemical | Acronym | MW (g/mol) | Supplier | conc |
|---|---|---|---|---|
| poly acrylic acid | PAA | 240000 | Sigma-Aldrich | 25% in H2O |
| poly acrylic co maleic acid | PAMA | 3000 | Sigma-Aldrich | 50% in H2O |
| Perrhenic acid | — | 251 | Sigma-Aldrich | 75-85 wt % in H2O |
| Tetraammine platinum hydroxide | — | 297 | Alfa Aesar | 9.96 wt. % Pt |

Simultaneous Addition Method

Table 2 shows the reagent amounts used in the preparation of each of the modified supports; the amounts indicated yield 15 g of TiO2/SiO2. Supports made via simultaneous impregnation of the additive and TALH are labelled 'Sim.' in the table. To prepare the supports, silica was first dried in a fan oven at 100° C. for at least two hours. After drying, the indicated amount of silica was weighed into a mixing vessel and covered briefly while it cooled to room temperature. If citric acid was used, this was first predissolved in the minimum amount of water while heating to 50° C. with stifling, and the solution was then cooled. The required amount of TALH was weighed into a beaker and mixed directly with either the citric acid solution or the as-purchased polyelectrolyte solutions. The solution volume was then topped up with distilled water to an amount equal to the SiO2 mass in g×1.6 mL/g. This solution was used to impregnate the cooled silica by adding the solution with stirring. The impregnated support was transferred to a crucible and calcined in a muffle furnace at the following setting:

Ramp at 2° C./min to 100° C., dwell for 5 hours
Ramp at 2° C./min to 250° C., dwell for 5 hours Following calcination, the mass of the support was determined. The purity of the support is calculated as Purity=15 g/mass after calcination*100%

This calculation allows an estimation of the amount of residual undecomposed (i.e., unreacted) precursor on the support.

Sequential Addition Method

The modified supports labelled 'Seq.' in Table 2 were made via sequential impregnation with the additive indicated, followed by TALH. The required amount of additive was diluted to 20 mL with distilled water. This solution was used to impregnate the cooled silica by adding the solution with stirring. The impregnated support was transferred to a crucible and calcined in a muffle furnace by ramping to 100° C. at 2° C./min and dwelling there for 5 hours. This polyelectrolyte-loaded support was cooled then to room temperature. The required amount of TALH was then diluted to 19 mL with distilled water and impregnated onto the polyelectrolyte-loaded support with stifling. The impregnated support was transferred to a crucible and calcined in a muffle furnace at the following setting:
1. Ramp at 2° C./min to 100° C., dwell for 5 hours
2. Ramp at 2° C./min to 250° C., dwell for 5 hours Following calcination, the purity was determined using the method above.

For impregnation step 2, 2.46 g citric acid were mixed with 7 mL $H_2O$ and heated to ~50° C. with stirring until fully dissolved. This was added to 17.25 g cobalt nitrate and heated to ~50° C. with stifling until fully dissolved. This solution was cooled to room temperature (total volume=15 mL) and was used to impregnate the calcined material from step 1. The impregnated support was calcined as follows:

TABLE 2

Preparation of titania modified silica: the mass of reagents used, purity of the finished support, and the pH of the solution for the supports made via simultaneous (Sim.) addition of TALH and additive are given

| Code | $TiO_2$ wt. % | Additive | Mode | Molar ratio additive to Ti | TALH (g) | AGC $SiO_2$ (g) | Additive (g) | Purity (%) | Sol pH |
|---|---|---|---|---|---|---|---|---|---|
| 1309-11-015-4 | 16 | CA | Sim. | 0.6 | 17.67 | 12.6 | 3.83 | 84.4 | 4.5 |
| 1310-28-015-2 | 12 | CA | Sim. | 0.6 | 13.25 | 13.2 | 2.73 | 87.7 | |
| 1309-23-015-1 | 16 | PAH | Seq. | 0.5 | 17.67 | 12.6 | 4.29 | 85.1 | — |
| 1309-23-015-2 | 16 | PAAM | Seq. | 1 | 17.67 | 12.6 | 4.26 | 80.6 | — |
| 1307-23-015-2 | 16 | PAAM | Sim. | 1 | 17.67 | 12.6 | 4.26 | 87.5 | 8.3 |
| 1309-27-015-2 | 16 | PEI | Seq. | 2 | 17.67 | 12.6 | 4.92 | 84.0 | — |
| 1308-06-015-3 | 16 | PAMA | Sim. | 1 | 17.67 | 12.6 | 5.63 | 83.8 | 4.6 |
| 1307-23-015-3 | 16 | PAMA | Sim. | 0.2 | 17.67 | 12.6 | 1.13 | 87.3 | 5.6 |
| 1309-10-015-1 | 16 | PAMA | Sim. | 1.25 | 17.67 | 12.6 | 7.04 | 87.1 | 4.6 |
| 1310-11-015-1 | 14 | PAMA | Sim. | 1 | 15.46 | 12.9 | 4.93 | 87.8 | 3.8 |
| 1310-11-015-2 | 10 | PAMA | Sim. | 1 | 11.04 | 13.5 | 3.52 | 84.8 | 3.7 |

Preparation of Catalysts

For each of the modified supports, a catalyst of formulation 42% Co 0.03% Pt 0.2% Re was prepared from the support as follows (summarised in Table 3). An impregnation solution was prepared first by dissolving 16.10 g cobalt nitrate in 7 mL water and heating to ~50° C. with stirring until fully dissolved. This solution was cooled to room temperature (total volume=14 mL) and was used to impregnate the support. The mass of support used was 10 g divided by the purity of the support, e.g. 11.76 g was used for a support of 85% purity. The impregnated support was calcined as follows: ramp at 2° C./min to 100° C. and dwell for 5 hours, ramp at 2° C./min to 200° C. and dwell for 3 hours, then ramp at 1° C./min to 250° C. and dwell for 3 hours.

ramp at 2° C./min to 100° C. and dwell for 5 hours, then ramp at 2° C./min to 250° C. and dwell for 3 hours.

For impregnation step 3, 2.30 g citric acid were mixed with 7 mL $H_2O$ and heated to ~50° C. with stirring until fully dissolved. This was added to 16.10 g cobalt nitrate with 0.070 g of the tetraamine platinum hydroxide solution (9.96 wt. % Pt) and 0.084 g of the perrhenic acid solution (75-85 wt % $HReO_4$). This was heated to ~50° C. with stirring until fully dissolved. This solution was cooled to room temperature (total volume=14.5 mL) and was used to impregnate the calcined material from step 1. The impregnated support was calcined as follows: ramp at 2° C./min to 100° C. and dwell for 5 hours, then ramp at 2° C./min to 250° C. and dwell for 3 hours.

TABLE 3

Preparation of a Catalyst from a modified support

| Impregnation # | BASE g | $Co(NO_3)_2 \cdot 6H2O$ g | $Co_3O_4$ g | Co g | citric acid g | Perrhenic acid g | $Pt(NH_3)_4(OH)_2$ g | Solution Volume mLs | calc. Wt g. | wt % Co (approx.) |
|---|---|---|---|---|---|---|---|---|---|---|
| 1 | 10 | 16.10 | 4.35 | 3.19 | 0.00 | 0.000 | 0.000 | 14.0 | 14.4 | 22.3 |
| 2 | | 17.25 | 4.66 | 3.42 | 2.46 | 0.000 | 0.000 | 15.0 | 19.0 | 34.8 |
| 3 | | 16.10 | 4.35 | 3.19 | 2.30 | 0.084 | 0.070 | 14.5 | 23.4 | 42.0 |

Large Co₃O₄ Crystallite Size (Crystallite Size is Synonymous with Co₃O₄ Particle Size)

Materials

| Materials | Supplier | conc |
|---|---|---|
| Citric acid monohydrate | Sigma | 99% |
| Cobalt nitrate hexahydrate | Sigma | 98% |
| Tetraammine platinum hydroxide | Alfa | 9.96% Pt |
| Perrhenic acid | Sigma | 75% |
| Titanium(IV) bis(ammonium lactato)dihydroxide (TALH) | Sigma | 50% |
| Titanium(IV) isopropoxide | Alfa | 99% |
| poly acrylic co maleic acid (PAMA) | Sigma | 50% |

Example (XRD Co₃O₄ Crystallite Size=8.9 nm)

Support Preparation

AGC 60/80-200 Å silica was dried in an oven at 100° C. for 2 hours. Once cool, 21.0 grams of the support was then impregnated with a titanium isopropoxide solution: 15.5 mL of titanium isopropoxide was diluted to a volume of 29 mL with isopropanol. This solution was added gradually to the support, with stifling. The impregnated yet still free-flowing support was dried in a muffle furnace at 400° C. for 10 hours; the required temperature was reached via a ramp of 2° C. per minute. These amounts yielded a support modified with 16 wt. % of TiO₂ on SiO₂.

A catalyst of formulation 45% Co 0.03% Pt 0.2% Re was prepared from the support as follows. An impregnation solution was prepared first by dissolving 20.7 g of cobalt nitrate hexahydrate in 5 mL of water and heating to ~50° C. with stirring until fully dissolved (final volume=19 mL). The solution was cooled to room temperature and used to impregnate 10 g of support. The as-impregnated support was dried and calcined as follows: ramp at 2° C./min to 100° C. and dwell for 5 hours, ramp at 2° C./min to 200° C. and dwell for 3 hours, then ramp at 1° C./min to 250° C. and dwell for 3 hours.

For impregnation step 2, 2.67 g citric acid were mixed with 7 mL H₂O and heated to ~50° C. with stirring until fully dissolved. This was added to 18.90 g of cobalt nitrate and heated to ~50° C. with stirring until fully dissolved.

This solution was cooled to room temperature (total volume=17.5 mL) and was used to impregnate the calcined material obtained from step 1. The as-impregnated material was dried and calcined as follows: ramp at 2° C./min to 100° C. and dwell for 5 hours, ramp at 2° C./min to 250° C. and dwell for 3 hours.

For impregnation step 3, 2.67 g citric acid were mixed with 5 mL H₂O and heated to ~50° C. with stirring, until fully dissolved. This was added to 18.9 g of cobalt nitrate and heated to 50° C. with stirring until fully dissolved. To the mixture 0.80 g of tetraammine platinum hydroxide and 0.096 g of perrhenic acid solutions was added. The mixture was heated until all the component were dissolved, cooled to room temperature and used to impregnate the calcined material obtained from step 2. The as-impregnated material was dried and calcined as follows: ramp at 2° C./min to 100° C. and dwell for 5 hours, ramp at 2° C./min to 250° C. and dwell for 3 hours.

Example (XRD Co₃O₄ Crystallite Size=10.3)

Support Preparation

AGC 60/80-200 Å silica was dried in an oven at 100° C. for 2 hours. Once cool, 13.5 grams of the support was then impregnated with a TALH aqueous solution: 11.04 mL of TALH was added to 3.52 g of PAMA and water to reach a volume of 22.9 mL. This solution was added gradually to the support, with stirring. The impregnated yet still free-flowing support was dried in a muffle furnace at 100° C. for 5 hours followed by calcination at 250° C. for 5 hours; the required temperatures were reached via a ramp of 2° C. per minute. These amounts yielded a support modified with 10 wt. % of TiO2 on SiO2.

Catalyst Preparation

A catalyst of formulation 42% Co 0.03% Pt 0.2% Re was prepared from the support as follows. An impregnation solution was prepared first by dissolving 16.10 g of cobalt nitrate hexahydrate in 7 mL of water and heating to ~50° C. with stifling until fully dissolved (final volume 14.3 mL). The solution was cooled to room temperature and used to impregnate 10 g of support. The as-impregnated support was dried and calcined as follows: ramp at 2° C./min to 100° C. and dwell for 5 hours, ramp at 2° C./min to 200° C. and dwell for 3 hours, then ramp at 1° C./min to 250° C. and dwell for 3 hours.

Fischer-Tropsch Reaction Tests—Single Channel Reactor

Catalyst was diluted with SiC at a 1:18 volume ratio and then tested in the reactor at 205° C. under syngas with a H₂:CO ratio of 2 (and 5% N₂ tracer) at a pressure of 290 psig and a GHSV of 12,400 hr⁻¹. The FT reaction was carried out for a total of 140 hours. The deactivation rate of the catalyst was calculated via a linear regression analysis of the percent of CO converted during the reaction between a time on stream of 24 hours until the end of the run (140 hours).

Fischer-Tropsch Reaction Tests—Single Channel Microchannel Reactor

Fischer-Tropsch synthesis was carried out in a single-channel microchannel reactor designed by Velocys Inc. The undiluted catalyst was loaded in a single channel as a packed bed, with coolant channels adjacent to the process channel. Typical process conditions were feed H₂/CO of either 2.0 or 1.8. Nitrogen gas concentrations of 16.5% to 35% were used depending on whether conditions were intended to simulate single pass feed from an SMR or SMR feed with partial tail-gas recycle, respectively. An operating pressure of 350 psig was used with a GHSV between 11,250 and 12,500 hr⁻¹.

Determination of Catalyst Porous Characteristics

The BET surface area of the catalysts was determined using nitrogen physisorption at 77 K in a Micromeritics Tristar II instrument. Prior to measurement, all samples were degassed in nitrogen at 150° C. for 3 hours. The pore size distribution, average pore size and total pore volume were determined using the Barrett, Joyner and Halenda (BJH) method, with adsorption isotherm pressure points over the range 0.25-0.99 P/Po.

Determination of Titania Surface Area

The titania surface area of the supports was determined using an isopropanol dehydration technique based on the literature (Biaglow et al., Catal. Lett. 13 (1992) 313-321; Hansprasopwattana et al., Catal. Lett. 45 (1997) 165-175). The support was first calcined to 400° C. for 2 hours (ramp rate 5° C./min) in a muffle furnace. Once cool, this support was impregnated with isopropanol to the point of incipient wetness. Approximately 20 mg of the impregnated material was placed in a TGA/DSC and weight loss monitored during the following treatment:
1. Flow inert gas (He) at 50 mL/min
2. Dwell at 25° C. for 30 min, then ramp 2° C./min to 400° C.

The mass loss around 200° C. was calculated using the TA (Thermal Analysis Instruments) universal analysis software. The start (T1) and end (T2) temperature of the isopropanol dehydration step was determined using the glass transition calculator, and the mass at these two temperatures returned. The moles of propene desorbed per gram of sample was then determined using the following equation:

$$\frac{\text{mols propene}}{\text{g sample}} = \frac{\text{g propanol converted to propene}}{\text{g sample}} \cdot \frac{\text{mol}}{60 \text{ g}}$$

$$= \frac{\text{mass}_{T1} - \text{mass}_{T2}}{\text{mass}_{T2}} \cdot \frac{\text{mol}}{60 \text{ g}}$$

The gas evolution in selected impregnated supports was followed using a mass spectrometer, to verify that only propene (m/z=41) was removed during the 200° C. step, and that no isopropanol (m/z=45) was desorbed.

Moles of propene/g sample was related to titania surface area via a set of bulk titania materials. Titania was made by mixing titanium isopropoxide with water, via the method of Nishiwaki et al. (J. Catal. 118 (1989) 498-501). A commercial titania (Sigma-Aldrich, 325 mesh, 99% anatase) was also used. The mols of propene/g sample of each of these materials was used and compared to the BET surface area, as shown in FIG. 1. The specific reactivity of titania for isopropanol dehydration was determined to be $0.87 \times 10^{18}$ molecules propene/m$^2$, which falls within the literature range. A linear regression gives a relationship between titania surface area and mols propene/g sample; this relationship was used to calculate titania surface area for the modified supports.

Results

Deposition of positively charged polyelectrolytes and negatively charged TALH on silica has been shown to produce a uniform film of titania via electrostatic absorption over the silica surface (Colloids and Surfaces A, 231 (2008) 233; Chem. Mater. 13 (2001) 3833; J. Phys. Chem. B 110 (2006) 15417). It is not known how combining TALH and citric acid alters the silica surface. Table 4 compares the physical properties of AGC silica modified with TALH and either citric acid or polyelectrolytes. These supports have all been calcined to 400° C. in air in order to convert the TALH precursor to TiO$_2$ before measurement.

The nitrogen physisorption results suggest there is no difference in porosity between the support modified with PAMA and that modified with citric acid. However, both show a decrease in pore volume and average pore diameter as compared to the parent silica, which suggests modification of the silica pore structure by the deposition of titania. The titania surface area of the modified supports is not as high as the BET surface area, which might suggest that the support surface is not fully covered by titania. However, it cannot be ruled out that the calcination to 400° C. which preceded this measurement has affected the titania surface. Other complicating factors which could affect this measurement include differences in the density of surface acid sites and the titania crystal structure between the supports and the calibration standards.

TABLE 4

Support properties for titania modified silica, after calcination to 400° C. in air

| Code | TiO$_2$ wt. % | Additive | Mode | Molar ratio Ad:Ti | BET A$_S$ (m$^2$/g) | Pore Vol. (mL/g) | Pore Dia. (Å) | TiO$_2$ A$_S$ (m$^2$/g) |
|---|---|---|---|---|---|---|---|---|
| Unmodified silica support | | | | | 369 | 1.65 | 180 | 0 |
| 1309-11-015-4 | 16 | CA | Sim. | 0.6 | 350 | 1.09 | 125 | 113 |
| 1310-28-015-2 | 12 | CA | Sim. | 0.6 | | | | 68 |
| 1309-23-015-1 | 16 | PAH | Seq. | 0.5 | | | | 116 |
| 1309-23-015-2 | 16 | PAAM | Seq | 1 | | | | 119 |
| 1309-27-015-2 | 16 | PEI | Seq. | 2 | | | | 131 |
| 1308-06-015-3 | 16 | PAMA | Sim. | 1 | 350 | 1.08 | 123 | 120 |
| 1307-23-015-3 | 16 | PAMA | Sim. | 0.2 | | | | 109 |
| 1309-10-015-1 | 16 | PAMA | Sim. | 1.25 | | | | 141 |
| 1310-11-015-1 | 14 | PAMA | Sim. | 1 | | | | 129 |
| 1310-11-015-2 | 10 | PAMA | Sim. | 1 | | | | 98 |

Although the titania surface area measurement may not provide an absolute value at this stage, relative changes in the surface area are likely indicative of changes in the titania dispersion. It is clear that at a 16% titania loading on the support, similar titania surface areas are achieved with either citric acid or polyelectrolytes added to TALH. The choice of polyelectrolyte and mode of addition (simultaneous or sequential) does not appear to create a strong difference in titania surface area. Increasing the polyelectrolyte:Ti molar ratio, as demonstrated for PAMA, was found to increase the titania surface areas.

Figure 2:
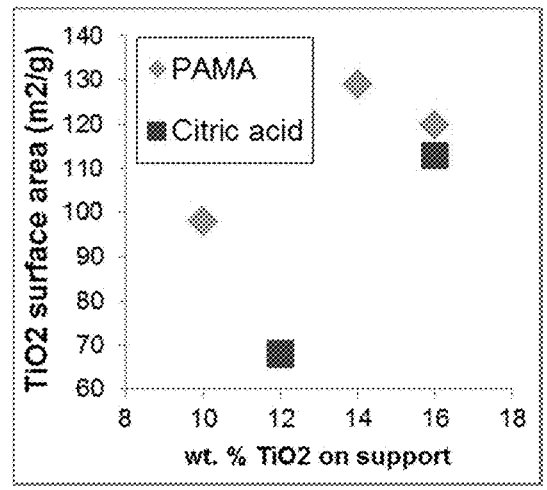
FIG. 2 (top) Titania surface area versus titania loading on support for PAMA and citric acid additives. (bottom) Pore size distribution in a selection of catalysts on titania modified silica supports.
Figure 2:
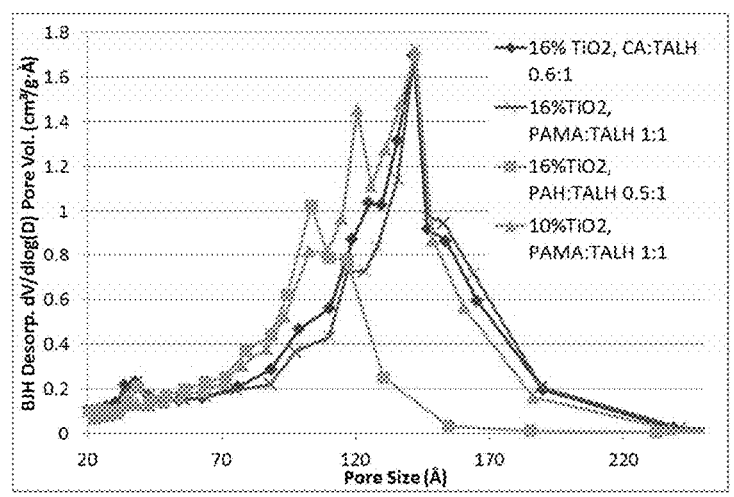

A strong difference between the polyelectrolyte and citric acid additives is noted at lower titania loadings, as shown in FIG. 2. When citric acid is used with TALH, the titania surface area decreases sequentially with the titania loading, i.e., the surface area when 12% TiO$_2$ is 40% less than when 16% TiO$_2$ is used. In contrast, when PAMA is used with TALH, the percentage decrease in surface area as the titania loading drops is smaller: at a 10% TiO$_2$ loading, the surface area is still 98 m$^2$/g, which is only a 20% reduction as compared to the 16% TiO$_2$ value. This showed that PAMA creates a better dispersion of titania across the silica surface, particularly at low titania loadings.

FTS catalysts can be made from these titania modified silica catalysts, and the porosity of these catalysts is described in Table 5. It is clear from this table that the highest porosity is achieved when no titania at all is used.

The results in Table 5 suggest that the effect of titania addition on the porosity depends largely on the choice of additive with TALH. Comparing the catalysts containing 16% TiO$_2$, the support made using citric acid has the highest pore volume and the largest average pore diameter. Using a polyelectrolyte appears to alter the porosity, but this effect depends on the nature of the polyelectrolyte. As the pore size distribution curves in FIG. 2 show, using polyallylamine hydrochloride (PAH) gives a pore size distribution strongly shifted to smaller pore diameters. In contrast, using PAMA gives a pore size distribution that is comparable to that obtained when citric acid is used.

The effect of the polyelectrolyte on the resulting catalyst porosity has been explored. Table 5 shows that a catalyst on a support modified with 12% TiO$_2$ using citric acid has a pore volume that is similar to the 16% TiO$_2$ catalyst, and an average pore diameter of 87 Å (2.8 Å larger than the 16% TiO$_2$ case). In contrast, the catalyst on a 10% TiO$_2$ support made using PAMA has the largest pore volume of any of the titania containing catalysts, and an average pore diameter of 92 Å. This shows that higher pore volumes and larger average pore diameters can be achieved by using PAMA with TALH to modify silica with lower titania loadings.

The performance of the catalysts on the modified silica supports in the fixed bed reactor is shown in Table 6. It is clear from the FTS test results that all of the catalysts containing titania are more stable than the catalyst on the unmodified silica support. The stability of the catalysts containing 16% TiO$_2$ and at least a 0.5 molar ratio of additive to titania can be compared, and it is clear that in this case using citric acid gives the least stable catalyst. Using polyelectrolytes to deposit titania improves the stability of the catalyst as compared to using citric acid.

Although the use of polyelectrolytes clearly improves FTS stability, the choice of polyelectrolyte has a strong impact on activity and selectivity. Using PAAM gives a catalyst of very low activity, regardless of whether the PAAM and TALH impregnations are simultaneous or sequential. Using PAH or PEI gives a catalyst with acceptable FTS activity, but with significantly increased methane selectivity and decreased C$_{5+}$ selectivity as compared to the catalyst made with citric acid. However, the polyelectrolyte PAMA is shown to give a catalyst with very high stability and activity, and with a selectivity that is not significantly different from the citric acid catalyst. This is in alignment with the trends in porosity of these catalysts, as shown in

TABLE 5

Porosity, as measured by nitrogen physisorption, for catalysts made on titania-modified silica.

| Code | TiO$_2$ wt. % | Additive | Mode | Molar ratio Ad:Ti | BET A$_S$ (m$^2$/g) | Pore Vol. (mL/g) | Pore Dia. (Å) |
|---|---|---|---|---|---|---|---|
| 1211-26-015-1 | 0 (unmodified silica support) | | | | 159 | 0.458 | 113 |
| 1301-04-015-1 | 16 | CA | Sim. | 0.6 | 167 | 0.363 | 84.0 |
| 1206-19-015-4 | 12 | CA | Sim. | 0.6 | 157 | 0.346 | 86.8 |
| 1309-24-015-1 | 16 | PAH | Seq. | 0.5 | 150 | 0.255 | 70.7 |
| 1308-06-015-1 | 16 | PAAM | Sim. | 1 | 161 | 0.277 | 70.8 |
| 1310-01-015-1 | 16 | PEI | Seq. | 2 | 152 | 0.224 | 64.3 |
| 1308-09-015-1 | 16 | PAMA | Sim. | 1 | 163 | 0.342 | 83.2 |
| 1308-06-015-2 | 16 | PAMA | Sim. | 0.2 | 155 | 0.311 | 82.9 |
| 1309-11-015-1 | 16 | PAMA | Sim. | 1.25 | 163 | 0.333 | 82.0 |
| 1310-14-015-1 | 14 | PAMA | Sim. | 1 | 160 | 0.337 | 84.2 |
| 1310-14-015-2 | 10 | PAMA | Sim. | 1 | 168 | 0.387 | 91.8 |

TABLE 6

FTS performance (at 24 hrs) of catalysts made on titania-modified silica. For the 16% TiO$_2$ via citric acid catalyst (1301-04-015-1), the average and standard deviation over 8 tests is shown

| Code | TiO$_2$ wt. % | Additive | Mode | Molar ratio | ρ (g/mL) | Run | X (%) | ΔX (%/d) | Selectivity (%) CH$_4$ | C$_{5+}$ |
|---|---|---|---|---|---|---|---|---|---|---|
| 1211-26-015-1 | 0 (unmodified silica support) | | | | 0.90 | 94 | 58.6 | −1.74 | 7.1 | 89.2 |
| 1301-04-015-1 | 16 | CA | Sim. | 0.6 | 1.10 | 93 to 113 | 68 ± 3.4 | −1.3 ± 0.22 | 6.8 ± 0.26 | 89.8 ± 0.5 |
| 1309-24-015-1 | 16 | PAH | Seq. | 0.5 | 1.24 | 113 | 71.7 | −1.13 | 8.6 | 87.8 |
| 1309-24-015-2 | 16 | PAAM | Seq. | 1 | 1.27 | 113 | 11.8 | 0.12 | 15.0 | 70.8 |
| 1308-06-015-1 | 16 | PAAM | Sim. | 1 | 1.20 | 110 | 10.9 | 0.04 | 16.1 | 69.9 |
| 1310-01-015-1 | 16 | PEI | Seq. | 2 | 1.24 | 114 | 53.5 | −0.75 | 10.3 | 83.8 |
| 1308-09-015-1 | 16 | PAMA | Sim. | 1 | 1.05 | 110 | 72.1 | −0.97 | 7.0 | 90.0 |
| 1308-06-015-2 | 16 | PAMA | Sim. | 0.2 | 1.10 | 110 | 69.6 | −1.43 | 7.4 | 89.0 |
| 1309-11-015-1 | 16 | PAMA | Sim. | 1.25 | 1.10 | 113 | 72.1 | −1.01 | 7.2 | 89.4 |
| 1310-14-015-1 | 14 | PAMA | Sim. | 1 | 1.11 | 116 | 77.9 | −0.93 | 7.0 | 90.0 |
| 1310-14-015-2 | 10 | PAMA | Sim. | 1 | 1.00 | 115 | 71.4 | −1.43 | 6.3 | 90.1 |

Table 5. These findings show that the catalyst synthesis can be improved by replacing citric acid with PAMA, thus generating a more stable catalyst with otherwise equal performance metrics.

than the 16% $TiO_2$ (citric acid) benchmark, and 2 absolute percentage points higher $C_{5+}$ selectivity. The temperature of the runs is not significantly different (202° C. versus 204° C./205° C.), suggesting the activity of the catalysts is

TABLE 7

FTS performance in a single channel microchannel reactor of catalysts on titania modified silica, made using citric acid or PAMA as an additive. The catalysts 1301-15-019-2 and 1307-19-015-1 were made to the same recipe as 1301-04-015-1.

| Catalyst Type Run | | 1301-04-015-1 4-Step Benchmark LP1007 | | 1308-09-015-1 PAMA + AGC KP3003 | | 1301-15-019-2 4-Step T8S2A, 10751-070 | | 1307-19-015-1 4-Step T8S2B, 10751-071 | | 1310-14-015-2 low TiO2 + PAMA LP1014 | |
|---|---|---|---|---|---|---|---|---|---|---|---|
| Time-on-Stream | (hr) | 150 | 250 | 150 | 250 | 146 | 246 | 147 | 247 | 187 | 287 |
| Average Reactor Temperature | (° C.) | 210 | 210 | 207 | 207 | 205 | 205 | 204 | 204 | 201.5 | 201.5 |
| Process Inlet Pressure | (psig) | 351 | 351 | 351 | 351 | 334 | 334 | 350 | 350 | 351 | 351 |
| Inlet $H_2$:CO | (mol/mol) | 1.79 | 1.79 | 1.79 | 1.79 | 1.85 | 1.85 | 1.85 | 1.85 | 1.85 | 1.85 |
| Diluent | (mol %) | 28.0 | 28.0 | 28.0 | 28.0 | 35.0 | 35.0 | 35.0 | 35.0 | 35.0 | 35.0 |
| Contact time | (ms) | 310 | 310 | 310 | 310 | 320 | 320 | 320 | 320 | 320 | 320 |
| Conversion of CO | | 76.0% | 74.7% | 76.3% | 75.8% | 76.2% | 75.1% | 77.4% | 76.6% | 76.6% | 77.2% |
| $CH_4$ Selectivity | | 5.2% | 5.1% | 5.1% | 5.0% | 5.4% | 5.4% | 5.4% | 5.4% | 4.6% | 4.6%* |
| C5+ Selectivity | | 91.4% | 91.6% | 90.3% | 90.4% | 89.7% | 89.9% | 89.7% | 89.9% | 91.9% | 91.9%* |
| Yield | | 69.5% | 68.5% | 68.9% | 68.5% | 68.4% | 67.5% | 69.4% | 68.8% | 70.4% | 70.9% |
| Cumulative Yield | | 68.8% | | 68.7% | | 68.0% | | 69.1% | | 70.6% | |
| Deactivation Rate (%/day) | | −0.20 | | −0.07 | | −0.20 | | −0.18 | | −0.16 | |
| Time on Stream for Deactivation (hr) | | 150 | 280 | 149 | 282 | 146 | 405 | 147 | 406 | 177 | 339 |

*= selectivity taken as same as start of window, no FID data available.

Figure 3:
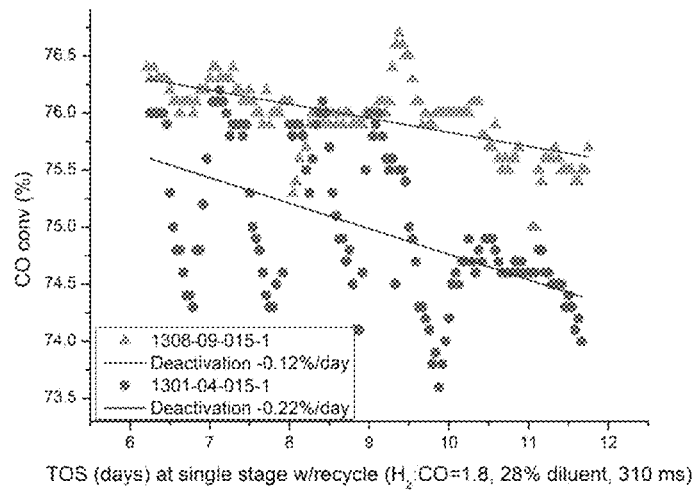
FIG. 3 shows stability of catalysts made using either the polyelectrolyte (PAMA) or citric acid additive with TALH during the titania modification step. The deactivation rate was determined in single stage with recycle conditions over the range shown. top—16% $TiO_2$ (PAMA) bottom—10% $TiO_2$ (PAMA), both compared to 16% $TiO_2$ (citric acid)
Figure 3:
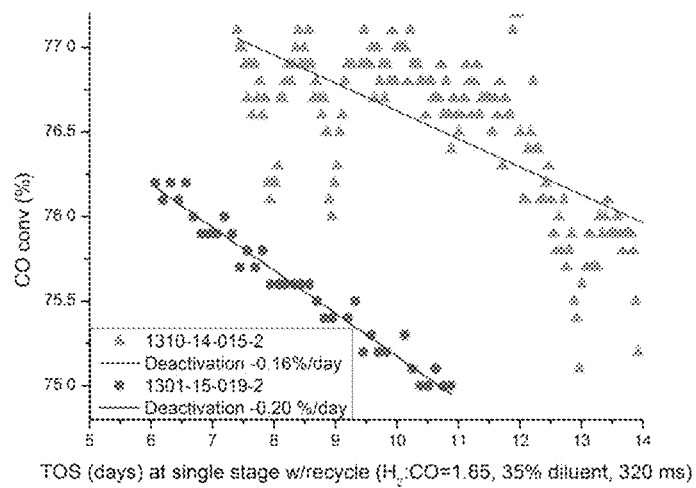

The stability improvement achieved by using polyelectrolytes has been tested in a single channel microchannel reactor. Table 7 compares the results of FTS microchannel tests for the 16% $TiO_2$ catalyst with citric acid (1301-04-015-1) and the 16% $TiO_2$ catalyst with PAMA in a 1:1 ratio (1308-09-015-1). It is clear from the results that the catalyst with PAMA has a slower deactivation rate than the catalyst with citric acid, and this is also shown graphically in FIG. 3. The temperature of the two runs is not significantly different (207° C. versus 210° C.), indicating that the activity of these formulations is similar. The methane selectivities of the two formulations are also not significantly different: 5.1% versus 5.2%. This shows that using PAMA instead of CA with TALH in the titania modification results in more stable catalyst, but does not negatively affect activity or selectivity.

As using less titania may result in a catalyst with higher pore volume without a large drop in titania surface area, the performance of catalysts with 14% and 10% $TiO_2$ using PAMA at a 1:1 molar ratio with TALH was determined, as shown in Table 6. The results in the fixed bed test show that as the titania loading is lowered, the methane selectivity progressively decreases and the $C_{5+}$ selectivity increases. A drop in stability is observed moving down to 10% $TiO_2$ via PAMA, but the deactivation rate is still not significantly worse than the 16% $TiO_2$ via citric acid formulation. An apparent decrease in methane selectivity, from 6.8% to 6.3%, is observed between the 16% $TiO_2$ (CA) and the 10% $TiO_2$ (PAMA) catalysts. This test suggests that decreasing the titania loading from 16% to 10% and replacing citric acid with PAMA causes a decrease in the methane selectivity while giving no change in FTS activity or stability.

The selectivity improvement achieved by using lower titania loadings with PAMA has been tested in a single channel microchannel reactor. Table 7 compares the results of FTS microchannel tests for the 16% $TiO_2$ catalyst with citric acid (1301-15-019-2 and 1307-19-015-1) and the 10% $TiO_2$ catalyst with PAMA in a 1:1 molar ratio (1310-14-015-2). The results show that a significant shift in the selectivity profile is observed: the PAMA catalyst has a methane selectivity 0.8 absolute percentage points lower similar. This results in a significantly higher $C_{5+}$ yield for the PAMA catalyst: compare 70.6% to 68.0%/69.1% for the 16% $TiO_2$ via citric acid catalyst. This means the $C_{5+}$ yield of the low titania PAMA formulation is 2 percentage points higher than the average 16% $TiO_2$ (citric acid) value. Additionally, the deactivation rate of the 10% $TiO_2$ PAMA formulation is comparable to that of the 16% $TiO_2$ citric acid benchmark: the deactivation rate is −0.16%/day when PAMA is used, versus −0.18/−0.20%/day for citric acid. This shows that PAMA can be used instead of citric acid to significantly increase the $C_{5+}$ yield of the catalyst without negatively affecting the FTS activity or stability.

Conclusions

Polyelectrolytes can be used to assist the modification of a silica support with titania; preferably the technique includes the use of the aqueous precursor TALH. This leads to catalysts with a greater stability, as compared to when citric acid is used with TALH. The choice of polyelectrolyte has a significant effect of FTS activity and selectivity, and trials with a number of polyelectrolytes gave a range in CO conversions from 10.9 to 77.9%, and a $C_{5+}$ selectivity range from 6.3 to 16.1%. Using polyacrylic co maleic acid (PAMA) with TALH unexpectedly leads to a catalyst with high $C_{5+}$ selectivity and FTS activity. This can be seen by the single channel microchannel comparison of the FTS performance of a 16% $TiO_2$ catalyst using citric acid (1301-04-015-1) or PAMA (1308-09-015-1). At comparable activity and stability, the PAMA catalyst was nearly twice as stable as the citric acid catalyst: a deactivation rate of −0.12%/day to −0.22% day.

At low titania loadings, using the polyelectrolyte PAMA creates a better titania coverage of the silica surface than citric acid, as demonstrated by its higher specific titania surface area. This means a stable catalyst can be achieved at lower titania loadings when PAMA is used, leading to higher catalyst pore volumes and lower methane selectivity during FTS. A low titania PAMA catalyst (1310-14-015-2) with just 10% $TiO_2$ has been compared to the standard citric acid catalyst (1301-04-015-1) in a single channel microchannel reactor, where it was shown that a $C_{5+}$ selectivity improvement of 2 percentage points was realized for the PAMA catalyst. Activity and stability were not affected, resulting in a $C_{5+}$ yield improvement of 2 percentage points over a catalyst produced from the 4-step 16% $TiO_2$ (citric acid) synthesis.

Propanol Dehydration Activity of FT Catalysts

The propanol dehydration activity refers to the number of moles of propene desorbed per gram from a sample following impregnation with isopropanol and subsequent catalytic dehydration. It can be used to characterize catalysts. For a set of 14 catalysts with varying FTS performance, in particular $C_{5+}$ selectivity, the physical properties were investigated, including the propanol dehydration reaction.

Test for Propanol Dehydration Activity

The titania surface area of the catalysts is determined using an isopropanol dehydration technique based on the literature (Biaglow et al., Catal. Lett. 13 (1992) 313-321; Hansprasopwattana et al., Catal. Lett. 45 (1997) 165-175). The catalyst is first calcined to 300° C. for 2 hours (ramp rate 5° C./min) in a muffle furnace. Once cool, this is impregnated with isopropanol to the point of incipient wetness. 20 mg of the impregnated material is placed in a TGA/DSC and weight loss monitored during the following treatment:

Flow inert gas (He) at 50 mL/min;
Dwell at 25° C. for 30 min, then ramp 2° C./min to 400° C.
The mass loss around 200° C. was calculated using the TA (Thermal Analysis Instruments) universal analysis software. The start (T1) and end (T2) temperature of the isopropanol dehydration step is determined using the derivative spectra of the weight change over time, and identifying the temperature at which this trace departed from the baseline mass loss rate, and then returned to the baseline. The activity of the catalyst for the dehydration reaction is measured as moles of propene desorbed per gram of sample, which is determined using the following equation:

$$\frac{\text{mols propene}}{\text{g sample}} = \frac{\text{g propanol converted to propene}}{\text{g sample}} \cdot \frac{\text{mol}}{60 \text{ g}}$$

$$= \frac{\text{mass}_{T1} - \text{mass}_{T2}}{\text{mass}_{T2}} \cdot \frac{\text{mol}}{60 \text{ g}}$$

The gas evolution in selected impregnated catalysts was followed using a mass spectrometer, to verify that only propene (m/z=41) was removed during the 200° C. step, and that no isopropanol (m/z=45) was desorbed.

Results

Figure 4:
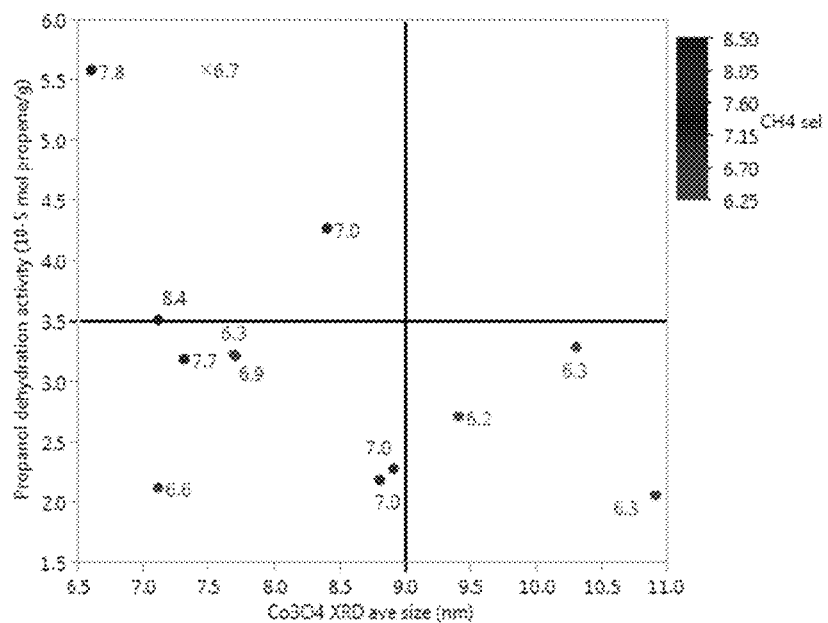
FIG. 4 illustrates propanol dehydration activity plotted against $Co_3O_4$ particle size, mapped against the $CH_4$ selectivity of the catalyst during the fixed bed reactor test. The numeric label beside each point indicates the $CH_4$ selectivity. Selectivity data at these conditions is not available for 1 catalyst, thus 13 points are plotted. X marks 1301-04-015-1.
Figure 5:
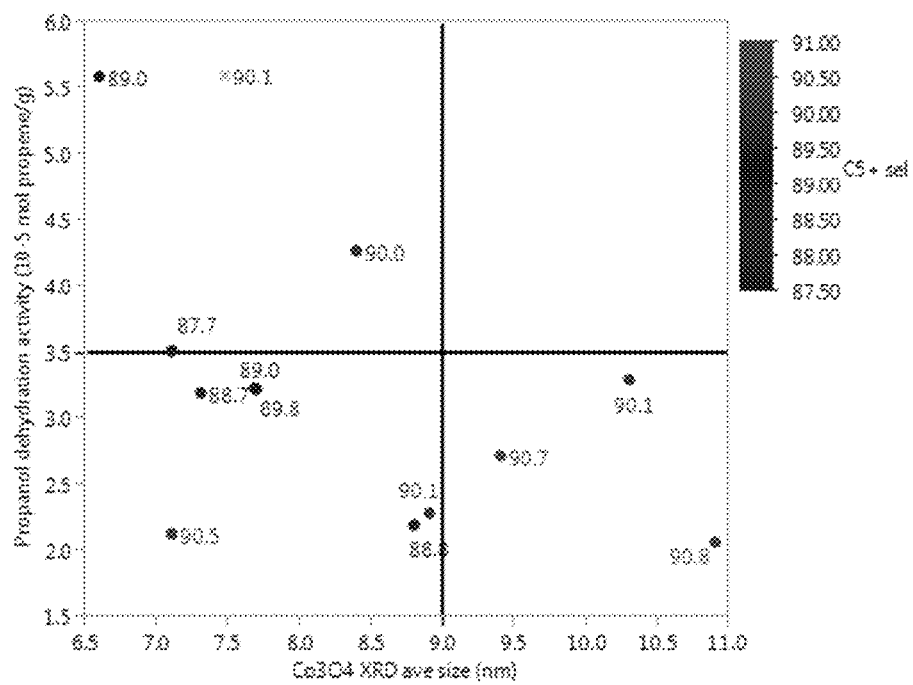
FIG. 5 illustrates propanol dehydration activity plotted against $Co_3O_4$ particle size, mapped against the $C_{5+}$ selectivity of the catalyst during the fixed bed reactor test. the numeric label beside each point indicates the $C_{5+}$ selectivity.

The results of the test for propanol dehydration activity for all 14 catalysts in the test data set is given in Table 8 These dehydration activities can be compared to the $Co_3O_4$ particle size and the FTS selectivity during the fixed bed reactor test in the single channel reactor, as shown in FIGS. 4 and 5. For the Figures, the average result of the FTS test has been plotted, as in some cases multiple FTS tests were performed. These figures show that the activity of these catalysts during the propanol dehydration test varies by a factor of 3. However, all of the catalysts with both high $C_{5+}$ selectivity and low methane selectivity in the fixed bed test have relatively low activity during the dehydration test: between 2.0 and $3.5 \times 10^{-5}$ mols propene desorbed per gram of sample. As well, all of these high selectivity catalysts also have $Co_3O_4$ particle sizes between 9 and 11 nm. Based on this result, we can therefore define a region that contains all of the catalysts with $CH_4$ selectivity ≤6.5% and C5+ selectivity ≥90.0%. This region has particle size ≥9 nm and propanol dehydration activity $<3.5 \times 10^{-5}$ mols propene desorbed per gram of sample.

Figure 6:
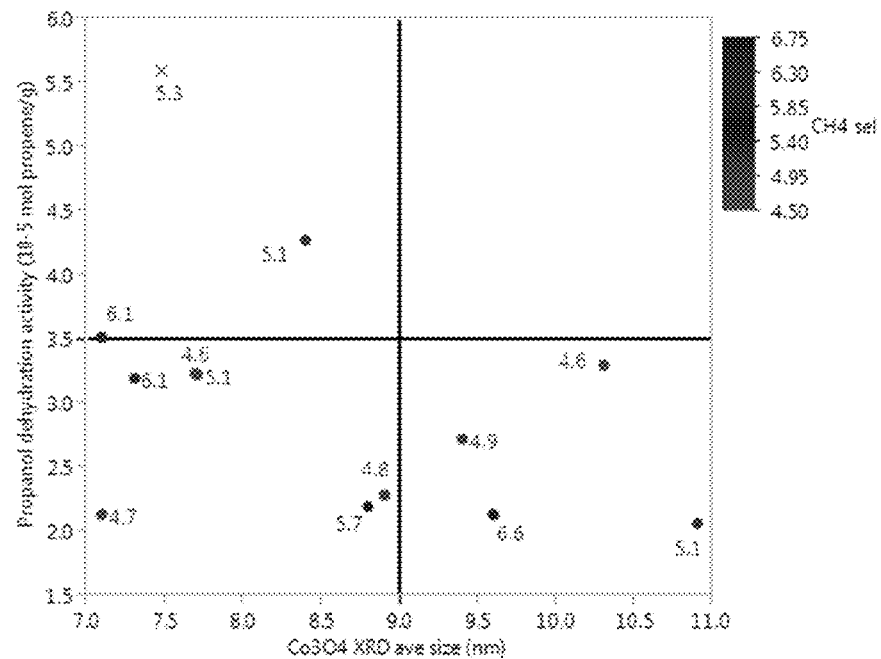
FIG. 6 illustrates propanol dehydration activity plotted against $Co_3O_4$ particle size, mapped against the $CH_4$ selectivity of the catalyst during the microchannel reactor test. The numeric label beside each point indicates the $CH_4$ selectivity.
Figure 7:
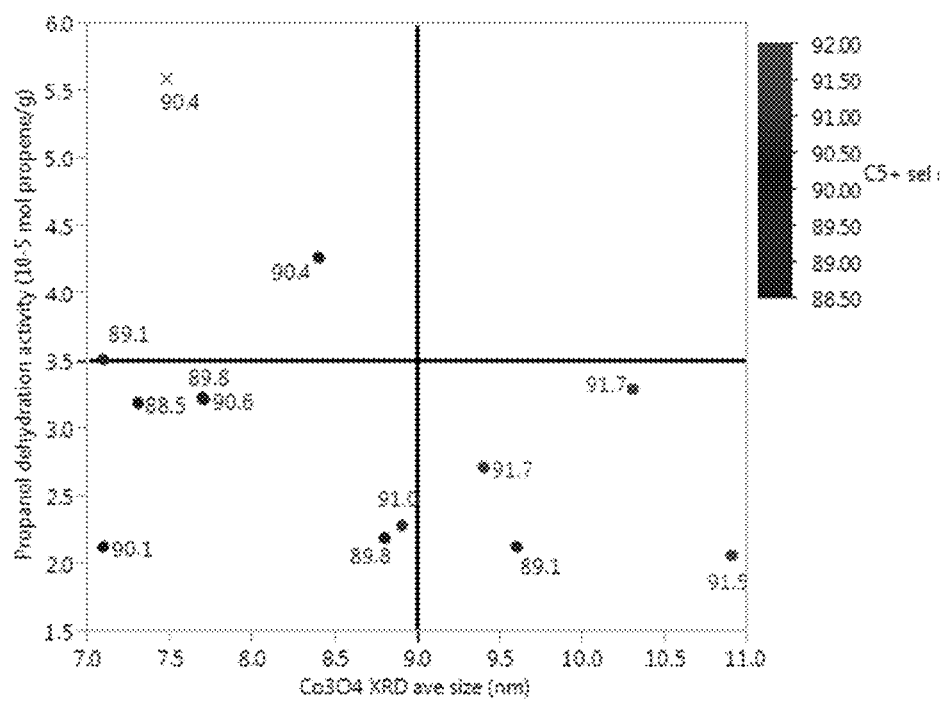
FIG. 7 illustrates propanol dehydration activity plotted against $Co_3O_4$ particle size, mapped against the $C_{5+}$ selectivity of the catalyst during the microchannel reactor test. The numeric label beside each point indicates the $C_{5+}$ selectivity.

We can also compare the propanol dehydration activity and $Co_3O_4$ particle size against selectivity during the microchannel reactor test, and this is shown in FIGS. 6 and 7. These comparisons include an additional catalyst (1101-05-003-1) for which data was not available for the fixed bed reactor tests. It is clear that this new addition falls into the region of large particle size above 9 nm and low propanol dehydration activity that defined the highest selectivity catalysts in the fixed bed tests, but does not possess high selectivity. The catalyst 1101-05-003-1 has high methane selectivity and low $C_{5+}$ selectivity, and thus does not follow the trend established by the single channel data.

Figure 8:
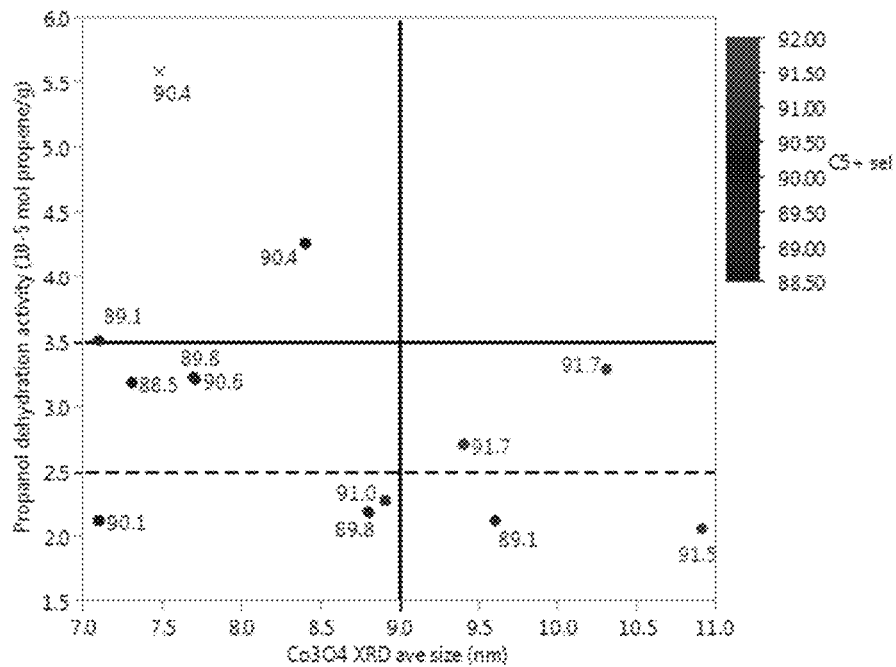
FIG. 8 illustrates propanol dehydration activity plotted against $Co_3O_4$ particle size, mapped against the $C_{5+}$ selectivity of the catalyst during the microchannel reactor test. The numeric label beside each point indicates the $C_{5+}$ selectivity.

So, to define the best performing catalysts exclusively, we need to consider a region in which propanol dehydration activity ranges from 2.5 to $3.5 \times 10^{-5}$ mols propene desorbed per gram of sample, and with $Co_3O_4$ particle size >9 nm. This region describes all of the catalysts with average $C_{5+}$ selectivity greater than 91.5% in the microchannel test, and does not contain any catalysts with lower selectivity. This region is shown in FIG. 8.

Figure 9:
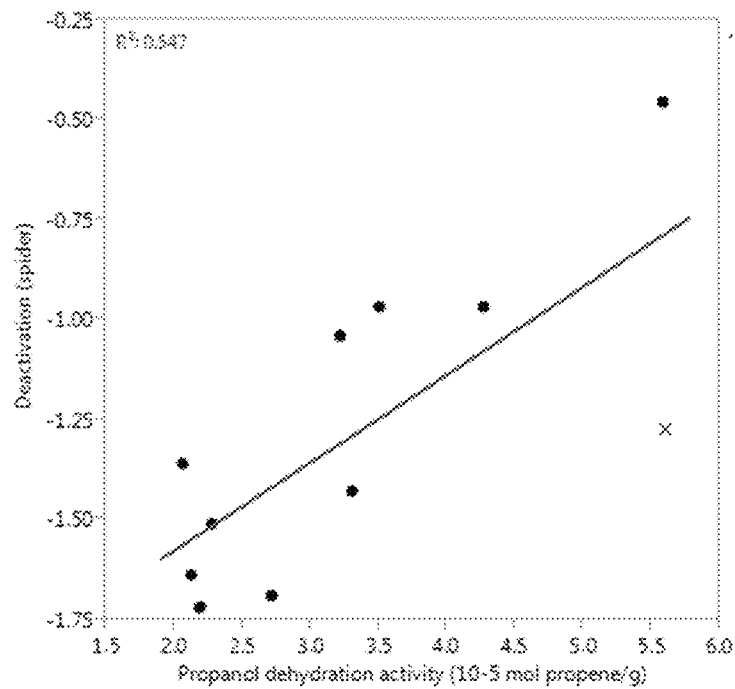
FIG. 9 illustrates propanol dehydration activity plotted against deactivation rate during the fixed bed reactor test. A linear best fit line and the $R^2$ value of this fit are shown. Two catalysts points were not included in this plot: 1209-20-003-1, and 1306-26-015-4, because they had CO conversion <65%. X marks 1301-04-015-1.

A further relationship between the activity for the propanol dehydration reaction and the catalyst FTS performance has been found. FIG. 9 shows the deactivation rate of the catalysts during the fixed bed test as compared to the propanol dehydration activity. As deactivation rate depends strongly on CO conversion level, only catalysts with CO conversion in the range 65 to 80% have been plotted. There is a linear correlation between the propanol dehydration activity and catalyst stability, where higher activity for the dehydration reaction corresponds to increased FTS stability. Based on the propanol dehydration activity and microchannel FTS data, we have unexpectedly discovered a range of 2.5 to $3.5 \times 10^{-5}$ mols propene desorbed per gram of sample, and $Co_3O_4$ particle size >9 nm where catalysts have high stability, excellent activity and excellent stability. Catalysts in this range are shown to have $C_{5+}$ selectivity greater than 91.5% during the microchannel reactor test.

TABLE 9

List of sample catalysts, with their tapped densities and porosities, and the results of the propanol dehydration activity test.

| Code | Description | ρ (g/mL) | Propanol dehydration activity (mols propene × $10^{-5}$/g sample) | Porosity) |
|---|---|---|---|---|
| 1304-05-019-2 | 4 step 46% Co 0.2% Re 0.03% Pt on 16% $TiO_2$/AGC Alkoxide | 1.08 | 2.28 | 0.369 |
| 1305-30-019-6 | 46% Co 0.03% P t0.2% Re on 4% B2O3/12% TiO2/AGC alkoxide 400° C. | 1.03 | 2.13 | 0.367 |

TABLE 9-continued

List of sample catalysts, with their tapped densities and porosities,
and the results of the propanol dehydration activity test.

| Code | Description | ρ (g/mL) | Propanol dehydration activity (mols propene × $10^{-5}$/g sample) | Porosity) |
|---|---|---|---|---|
| 1306-26-015-2 | 43% Co (Lactic acid: Co 0.21) 0.03% Pt 0.2% Re on 12% TiO2/AGC (TALH + CA) | 1.02 | 2.07 | 0.372 |
| 1307-04-019-6 | 46% Co 0.03% Pt 0.2% Re on 16% TiO2/AGC alkoxide 400° C. | 1.06 | 2.72 | 0.363 |
| 1301-04-015-1 | 4-step [42% Co (CA: Co 0.2) 0.03% Pt 0.2% Re on 16% TiO2/AGC (TALH + CA)] | 1.10 | 5.60 | 0.379 |
| 1306-26-015-4 | 42% Co (CA: Co 0.2) 0.03% Pt 0.2% Re 1.4% Mn2O3 on 16% TiO2/AGC (TALH + CA) | 1.07 | 3.23 | 0.356 |
| 1308-09-015-1 | 42% Co(CA 0.2M) 0.2% Re 0.03% Pt 16% TiO2(PAMA, 1:1)/AGC - 4 step | 1.05 | 4.27 | 0.348 |
| 1310-14-015-2 | 42% Co 0.2% Re 0.03% Pt (CA: Co 0.2) on 10% TiO2 on AGC (PAMA 1:1) | 1.00 | 3.30 | 0.375 |
| 1310-23-015-4 | 45% Co 0.2% Re 0.03% Pt (CA: Co 0.2) on 16% TiO2 (PAMA:TiOiPr 1:1,) on AGC | 1.08 | 2.19 | 0.359 |
| 1310-08-015-1 | 45% Co 0.2% Re 0.03% Pt (Lactic acid: Co 0.21) on 11% TiO2/PD12058(PAMA 1:1) | 1.00 | 3.22 | 0.344 |
| 1101-05-003-1 | ActOCat 1100 [43% Co 0.2% Re 0.03% Pt on 16% TiO2/LC150 (via TiOiPr)] | 1.13 | 2.13 | 0.293 |
| 1303-04-003-1 | ActOCat 1200 [43% Co 0.2% Re 0.03% Pt on 16% TiO2/LC150 (TALH + CA)] | 1.13 | 3.51 | 0.289 |
| 1207-09-003-2 | ActOCat 1200, labscale, on PD12058 (PQ code 2583-95-10) | 1.11 | 5.59 | 0.326 |
| 1209-20-003-1 | ActOCat 1200, 10 kg, on PD12058 (PQ code 2583-126-6) | 1.04 | 3.19 | 0.350 |

Volumetric Cobalt Loading and FTS Selectivity

For a set of 14 catalysts with varying FTS performance, in particular $C_{5+}$ selectivity, the physical properties have been investigated in order to determine which physical properties closely correlate to the FTS performance. One measureable property is the cobalt loading on a volume basis: in other words, the mass of cobalt present in a volume charge of catalyst. This is referred to here as the 'volumetric cobalt loading'.

Method of Measuring Volumetric Cobalt Loading

The cobalt loading on a weight basis (e.g. mass of cobalt/mass of catalyst) is first determined. This can be approximated from the nominal cobalt loading of the catalyst, or it can be measured using elemental analysis techniques, for example, ICP-OES. The mass of catalyst per unit volume of catalyst charge, ρ, is then determined. This could be calculated, for example, from loading a known volume of reactor with catalyst and then weighing the amount of catalyst loaded, and from this calculating the mass of catalyst loaded per volume of reactor. It can also be approximated using the tapped density of the catalyst, measured ex-situ using automated tap density analyzers (e.g. Autotap—Quantachrome Instruments, GeoPyc—Micromeritics Instrument Corporation) or standard densification protocol of using a vibrating table.

The volumetric cobalt loading is then determined via:

$$\text{Volumetric cobalt loading} = \frac{\text{Cobalt loading in wt. \%}}{100} * \rho$$

Figure 10:
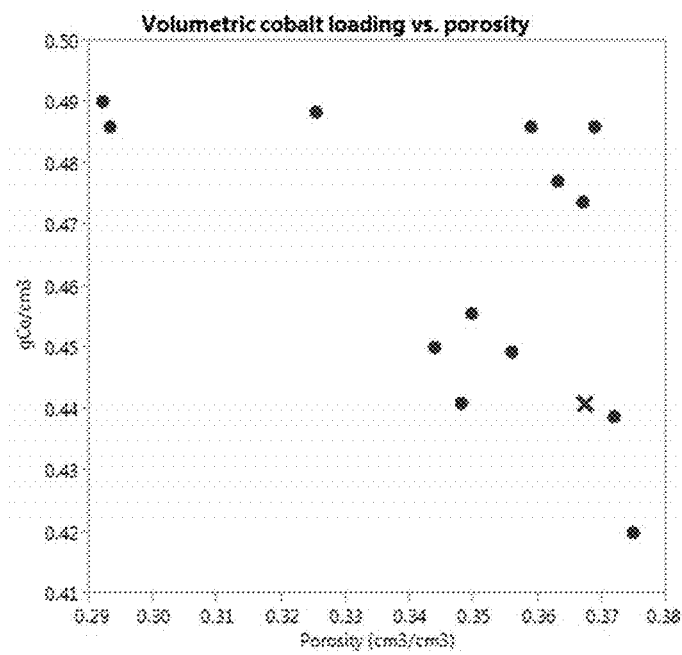
FIG. 10 shows volumetric cobalt loading plotted against catalyst porosity. X marks 1301-04-015-1
Figure 11:
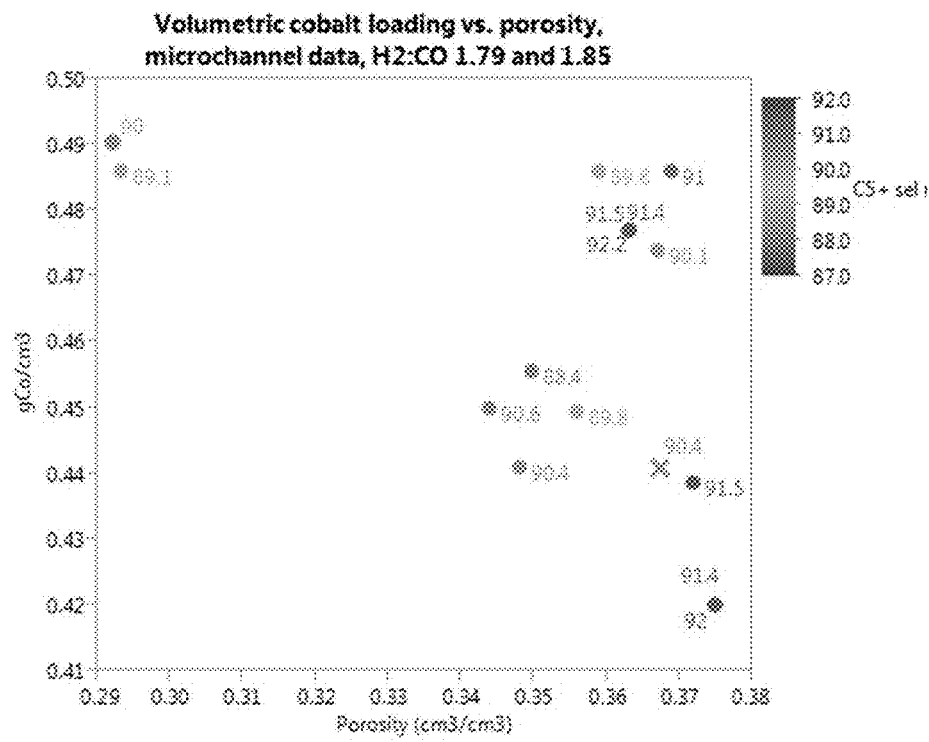
FIG. 11 shows volumetric cobalt loading plotted against catalyst porosity, mapped against the $C_{5+}$ selectivity of the catalyst during the microchannel reactor test. The numeric label beside them indicate the $C_{5+}$ selectivity.

In this example, the cobalt loading on a weight basis was determined from the nominal cobalt loading of the catalyst. The mass of catalyst per unit volume of catalyst charge is approximated by the tap density. Volumetric cobalt loading is then determined as $gCo/cm^3$ Results The volumetric cobalt loading for all 14 catalysts in the test data set is given in the Table below. These volumetric cobalt loadings can be compared to the porosity, as shown in in FIG. 10. It is clear from this Figure that a set of catalysts with similar volumetric cobalt loading (around 0.49 $g_{Co}/cm_3$) but porosities ranging from 0.29 to 0.37 has been generated. As well, there are a number of catalysts with high porosities around 0.37 but with volumetric cobalt loadings ranging from 0.42 to 0.49. This suggests that porosity and volumetric cobalt loading are not completely correlated for this data set. This shows that catalysts having about 50% of the volume charge as cobalt metal, leading to high FTS activity, while maintaining high porosities of 0.37, thus favoring high $C_{5+}$ selectivity. Indeed, as FIG. 11 shows, a number of catalysts with high $C_{5+}$ selectivity have been generated. However, FIG. 11 shows that there is not a strong relationship between volumetric cobalt loading and FTS selectivity, and thus this variable alone cannot predict $C_{5+}$ selectivity.

TABLE 10

List of sample catalysts, tapped densities, nominal cobalt loadings,
calculated volumetric cobalt loading, and porosity

| Code | Description | ρ (g/mL) | Co loading (wt %) | Volumetric cobalt loading ($g_{Co}/cm^3$) | Porosity |
|---|---|---|---|---|---|
| 1304-05-019-2 | 4 step 46% Co 0.2% Re 0.03% Pt on 16% $TiO_2$/AGC Alkoxide | 1.08 | 45 | 0.49 | 0.369 |
| 1305-30-019-6 | 46% Co 0.03% P t0.2% Re on 4% B2O3/12% TiO2/AGC alkoxide 400° C. | 1.03 | 45 | 0.46 | 0.367 |
| 1306-26-015-2 | 43% Co (Lactic acid: Co 0.21) 0.03% Pt 0.2% Re on 12% TiO2/AGC (TALH + CA) | 1.02 | 43 | 0.44 | 0.372 |
| 1307-04-019-6 | 46% Co 0.03% Pt 0.2% Re on 16% TiO2/AGC alkoxide 400° C. | 1.06 | 45 | 0.48 | 0.363 |
| 1301-04-015-1 | 4-step [42% Co (CA: Co 0.2) 0.03% Pt 0.2% Re on 16% TiO2/AGC (TALH + CA)] | 1.10 | 42 | 0.46 | 0.379 |
| 1306-26-015-4 | 42% Co (CA: Co 0.2) 0.03% Pt 0.2% Re 1.4% Mn2O3 on 16% TiO2/AGC (TALH + CA) | 1.07 | 42 | 0.45 | 0.356 |
| 1308-09-015-1 | 42% Co(CA 0.2M) 0.2% Re 0.03% Pt 16% TiO2(PAMA, 1:1)/AGC - 4 step | 1.05 | 42 | 0.44 | 0.348 |
| 1310-14-015-2 | 42% Co 0.2% Re 0.03% Pt (CA: Co 0.2) on 10% TiO2 on AGC (PAMA 1:1) | 1.00 | 42 | 0.45 | 0.375 |
| 1310-23-015-4 | 45% Co 0.2% Re 0.03% Pt (CA: Co 0.2) on 16% TiO2 (PAMA:TiOiPr 1:1,) on AGC | 1.08 | 45 | 0.49 | 0.359 |
| 1310-08-015-1 | 45% Co 0.2% Re 0.03% Pt (Lactic acid: Co 0.21) on 11% TiO2/PD12058(PAMA 1:1) | 1.00 | 45 | 0.45 | 0.344 |
| 1101-05-003-1 | ActOCat 1100 [43% Co 0.2% Re 0.03% Pt on 16% TiO2/LC150 (via TiOiPr)] | 1.13 | 43 | 0.49 | 0.293 |
| 1303-04-003-1 | ActOCat 1200 [43% Co 0.2% Re 0.03% Pt on 16% TiO2/LC150 (TALH + CA)] | 1.13 | 43 | 0.49 | 0.289 |
| 1207-09-003-2 | ActOCat 1200, labscale, on PD12058 (PQ code 2583-95-10) | 1.11 | 43 | 0.48 | 0.326 |
| 1209-20-003-1 | ActOCat 1200, 10 kg, on PD12058 (PQ code 2583-126-6) | 1.04 | 43 | 0.45 | 0.350 |

FTS Performance of Selected FT Catalysts

For a set of 14 catalysts with varying physical properties (porosity, propanol dehydration activity, $Co_3O_4$ particle size) the FTS performance was determined via both a fixed bed and a microchannel reactor test. Various FTS performance metrics then compared to the physical properties to determine which properties defined the best performing catalysts.

Fixed Bed Reactor Test

For FTS in the single channel reactor, a catalyst sample of volume of 0.129 mL was diluted with 2.184 mL of SiC (1:18 volume ratio) and loaded into a reactor with L/D=31 cm. A reduction was carried out using pure hydrogen at 400° C., with a ramp rate of 1° C./min and a dwell time of 120 minutes. Hydrogen flow was maintained at a GHSV of 15 000 $hr^{-1}$. After this reduction, the reactor was cooled to 165° C. and the gas flow switched to synthesis gas ($H_2$:CO 2:1, 5% $N_2$ diluent) before holding at this temperature for 1 hour. The pressure was then increased to 20 bar at a flow rate of 12 400 $hr^{-1}$ and held there for a further hour. At a ramp rate of 4° C./hour, the temperature was increased from 165° C. to 190° C. whilst maintaining this flow rate, and then increased from 190° C. to 205° C. at a ramp rate of 2° C./hour. The temperature was then held at 205° C. for ~140 hours for the FT reaction. The liquid products of this reaction were trapped in hot and cold knock out pots, and the gas products were injected online to a Clarus 600 gas chromatograph. Hydrogen, carbon monoxide and nitrogen were detected with a thermal conductivity detector and hydrocarbons from $C_1$ to $C_4$ were detected with a flame ionisation detector. Conversion and product selectivity were calculated using nitrogen as a tracer and employing a carbon mass balance. The deactivation rate was calculated via linear regression analysis on the CO percent conversion from a time on stream of 24 hours until the end of the run (~140 hours).

Single Channel Microchannel Reactor Test

Fischer-Tropsch synthesis was carried out in a single-channel microchannel reactor designed by Velocys Inc. The undiluted catalyst was loaded in a single channel as a packed bed, with coolant channels adjacent to the process channel. A reduction was carried out using pure hydrogen at 400° C., with a ramp rate of 1° C./min and a dwell time of 120 minutes. Hydrogen flow was maintained at a GHSV of 15 000 $hr^{-1}$. After this reduction, the reactor was cooled to 170° C., and hydrogen flow continued at this temperature for 6 hours. The gas flow was switched to synthesis gas ($H_2$:CO molar ratio and diluent level varied between tests) and held at this temperature for 1 hour. The pressure was then increased to 350 psig (syngas flow rate varied between tests). At a ramp rate of 1.5° C./hour, the temperature was increased from 170° C. to the desired reaction temperature—this was varied to target a CO conversion between 75 and 77%.

The process conditions varied both during individual microchannel test and between different tests, but only two sets of conditions (both of which are designed to simulate single stage with recycle operation) were used to collect the data: A) $H_2$:CO 1.79, GHSV 11,613 $hr^{-1}$, 28% diluent, B) $H_2$:CO 1.85, GHSV 11,250 $hr^{-1}$, 35% diluent These sets of conditions are referred to by their respective $H_2$:CO ratios in Table 13.

Results

The results of the FTS performance tests are summarised in the Tables below. For some of the catalysts, multiple tests were performed in each of the microchannel and the single-channel reactor. Tables 11 and 12 show the averaged value of the test metric in the fixed bed and microchannel for all tests on a given catalyst, whilst Tables 13 and 14 show the individual test values.

TABLE 11

List of sample catalysts, with their tapped densities and average FTS performance during the microchannel reactor test.t1 and t2 values have been averaged together for each metric.

| Code | Description | ρ (g/mL) | Ave. CO conv. (%) | Ave. $CH_4$ sel. (%) | Ave. $C_{5+}$ sel. (%) | Temp (° C.) |
|---|---|---|---|---|---|---|
| 1304-05-019-2 | 4 step 46% Co 0.2% Re 0.03% Pt on 16% TiO2/AGC Alkoxide | 1.08 | 75.0 | 4.8 | 91.0 | 204 |
| 1305-30-019-6 | 46% Co 0.03% Pt 0.2% Re on 4% B2O3/12% TiO2/AGC alkoxide 400° C. | 1.03 | 74.1 | 4.7 | 90.1 | 204 |
| 1306-26-015-2 | 43% Co (Lactic acid:Co 0.21) 0.03% Pt 0.2% Re on 12% TiO2/AGC (TALH + CA) | 1.02 | 75.1 | 5.1 | 91.5 | 208 |
| 1307-04-019-6 | 46% Co 0.03% Pt 0.2% Re on 16% TiO2/AGC alkoxide 400° C. | 1.06 | 76.2 | 4.9 | 91.7 | 207.5 |
| 1301-04-015-1 | 4-step [42% Co (CA:Co 0.2) 0.03% Pt 0.2% Re on 16% TiO2/AGC (TALH + CA)] | 1.10 | 76.0 | 5.3 | 90.4 | 206.3 |
| 1306-26-015-4 | 42% Co (CA:Co 0.2) 0.03% Pt 0.2% Re 1.4% Mn2O3 on 16% TiO2/AGC (TALH + CA) | 1.07 | 76.2 | 4.6 | 89.8 | 210 |
| 1308-09-015-1 | 42% Co(CA 0.2M) 0.2% Re 0.03% Pt 16% TiO2(PAMA, 1:1)/AGC - 4 step | 1.05 | 76.1 | 5.1 | 90.4 | 207 |
| 1310-14-015-2 | 42% Co 0.2% Re 0.03% Pt (CA:Co 0.2) on 10% TiO2 on AGC (PAMA 1:1) | 1.00 | 76.9 | 4.6 | 91.7 | 202.5 |
| 1310-23-015-4 | 45% Co 0.2% Re 0.03% Pt (CA:Co 0.2) on 16% TiO2 (PAMA:TiOiPr 1:1,) on AGC | 1.08 | 75.9 | 5.7 | 89.8 | 208 |
| 1310-08-015-1 | 45% Co 0.2% Re 0.03% Pt (Lactic acid:Co 0.21) on 11% TiO2/PD12058(PAMA 1:1) | 1.00 | 75.8 | 5.1 | 90.6 | 202.5 |
| 1101-05-003-1 | ActOCat 1100 [43% Co 0.2% Re 0.03% Pt on 16% TiO2/LC150 (via TiOiPr)] | 1.13 | 75.5 | 6.6 | 89.1 | 212 |
| 1303-04-003-1 | ActOCat 1200 [43% Co 0.2% Re 0.03% Pt on 16%/TiO2/LC150 (TALH + CA)] | 1.13 | 75.4 | 6.1 | 89.1 | 205.4 |
| 1207-09-003-2 | ActOCat 1200, labscale, on PD12058 (PQ code 2583-95-10) | 1.11 | Not available | | | |
| 1209-20-003-1 | ActOCat 1200, 10 kg, on PD12058 (PQ code 2583-126-6) | 1.04 | 75.8 | 6.1 | 88.5 | 207 |

TABLE 12

List of sample catalysts, with their tapped densities and average FTS performance during the fixed bed reactor test.

| Code | Description | ρ (g/mL) | CO conv. t1 (%) | $CH_4$ sel. t1 (%) | $C_{5+}$ sel. t1 (%) | Deactivation rate (%/day) |
|---|---|---|---|---|---|---|
| 1304-05-019-2 | 4 step 46% Co 0.2% Re 0.03% Pt on 16% TiO2/AGC Alkoxide | 1.08 | 76.9 | 7.0 | 90.1 | −1.51 |
| 1305-30-019-6 | 46% Co 0.03% Pt 0.2% Re on 4% B2O3/12% TiO2/AGC alkoxide 400° C. | 1.03 | 71.6 | 6.6 | 90.5 | −1.64 |

TABLE 12-continued

List of sample catalysts, with their tapped densities and average FTS performance during the fixed bed reactor test.

| Code | Description | ρ (g/mL) | CO conv. t1 (%) | CH₄ sel. t1 (%) | C₅₊ sel. t1 (%) | Deactivation rate (%/day) |
|---|---|---|---|---|---|---|
| 1306-26-015-2 | 43% Co (Lactic acid:Co 0.21) 0.03% Pt 0.2% Re on 12% TiO2/AGC (TALH + CA) | 1.02 | 71.9 | 6.3 | 90.8 | −1.36 |
| 1307-04-019-6 | 46% Co 0.03% Pt 0.2% Re on 16% TiO2/AGC alkoxide 400° C. | 1.06 | 69.2 | 6.2 | 90.7 | −1.69 |
| 1301-04-015-1 | 4-step [42% Co (CA:Co 0.2) 0.03% Pt 0.2% Re on 16% TiO2/AGC (TALH + CA)] | 1.10 | 69.8 | 6.7 | 90.1 | −1.30 |
| 1306-26-015-4 | 42% Co (CA:Co 0.2) 0.03% Pt 0.2% Re 1.4% Mn2O3 on 16% TiO2/AGC (TALH + CA) | 1.07 | 51.7 | 6.3 | 89.0 | −0.46 |
| 1308-09-015-1 | 42% Co(CA 0.2M) 0.2% Re 0.03% Pt 16% TiO2(PAMA, 1:1)/AGC - 4 step | 1.05 | 72.1 | 7.0 | 90.0 | −0.97 |
| 1310-14-015-2 | 42% Co 0.2% Re 0.03% Pt (CA:Co 0.2) on 10% TiO2 on AGC (PAMA 1:1) | 1.00 | 71.5 | 6.3 | 90.1 | −1.43 |
| 1310-23-015-4 | 45% Co 0.2% Re 0.03% Pt (CA:Co 0.2) on 16% TiO2 (PAMA:TiOiPr 1:1,) on AGC | 1.08 | 65.8 | 7.0 | 88.8 | −1.72 |
| 1310-08-015-1 | 45% Co 0.2% Re 0.03% Pt (Lactic acid:Co 0.21) on 11% TiO2/PD12058(PAMA 1:1) | 1.00 | 70.6 | 6.9 | 89.8 | −1.04 |
| 1101-05-003-1 | ActOCat 1100 [43% Co 0.2% Re 0.03% Pt on 16% TiO2/LC150 (via TiOiPr)] | 1.13 | Not available | | | |
| 1303-04-003-1 | ActOCat 1200 [43% Co 0.2% Re 0.03% Pt on 16% TiO2/LC150 (TALH + CA)] | 1.13 | 74.5 | 8.4 | 87.7 | −0.97 |
| 1207-09-003-2 | ActOCat 1200, labscale, on PD12058 (PQ code 2583-95-10) | 1.11 | 68.5 | 7.8 | 89.0 | −0.46 |
| 1209-20-003-1 | ActOCat 1200, 10 kg, on PD12058 (PQ code 2583-126-6) | 1.04 | 62.2 | 7.7 | 88.7 | −0.05 |

TABLE 13

Individual FTS performance tests in a microchannel reactor for the catalysts in this study. Temperature was kept constant at the indicated value between t1 and t2.

| Code | Run ID | H₂:CO | t1 (hr) | t2 (hr) | CO conv. t1 (%) | CO conv. t2 (%) | CH₄ sel. t1 (%) | CH₄ sel. t2 (%) | C₅₊ sel. t1 (%) | C₅₊ sel. t2 (%) | Temp (° C.) |
|---|---|---|---|---|---|---|---|---|---|---|---|
| 1304-05-019-2 | KP 3002 | 1.79 | 150 | 250 | 75.6 | 74.4 | 4.8 | 4.7 | 90.8 | 91.1 | 204 |
| 1305-30-019-6 | T8S2 10737 | 1.79 | 168 | 269 | 74.9 | 73.2 | 4.7 | 4.7 | 90.0 | 90.2 | 204 |
| 1306-26-015-2 | LP 1011 | 1.79 | 150 | 250 | 75.7 | 74.4 | 5.1 | 5.1 | 91.5 | 91.5 | 208 |
| 1307-04-019-6 | LP 1013 | 1.79 | 150 | 250 | 76.2 | 75.0 | 4.7 | 4.7 | 92.2 | 92.2 | 207 |
| 1307-04-019-6 | LP 1013 | 1.85 | 772 | 872 | 77.8 | 77.4 | 4.9 | 4.9 | 91.5 | 91.5 | 205 |
| 1307-04-019-6 | LP 1012 | 1.79 | 150 | 250 | 75.4 | 75.5 | 5.1 | 5.1 | 91.1 | 91.8 | 210.5 |
| 1301-04-015-1 | LP 1007 | 1.79 | 150 | 250 | 76.0 | 74.7 | 5.2 | 5.1 | 91.4 | 91.6 | 210 |
| 1301-04-015-1 | T8S2A 10751 | 1.85 | 146 | 246 | 76.2 | 75.1 | 5.4 | 5.4 | 89.7 | 89.9 | 205 |
| 1301-04-015-1 | T2S2B 10751 | 1.85 | 147 | 247 | 77.4 | 76.6 | 5.4 | 5.4 | 89.7 | 89.9 | 204 |
| 1306-26-015-4 | T8S2 10751 | 1.79 | 263 | 332 | 78.0 | 74.3 | 4.5 | 4.6 | 89.9 | 89.6 | 210 |
| 1308-09-015-1 | KP 3003 | 1.79 | 150 | 250 | 76.3 | 75.8 | 5.1 | 5.0 | 90.3 | 90.4 | 207 |
| 1310-14-015-2 | LP 1014 | 1.85 | 363 | 463 | 77.4 | 77.6 | 4.6 | 4.6 | 92.0 | 92.0 | 202.5 |
| 1310-14-015-2 | KP 3006 | 1.85 | 159 | 259 | 76.7 | 75.8 | 4.6 | 4.6 | 91.4 | 91.5 | 202.5 |

TABLE 13-continued

Individual FTS performance tests in a microchannel reactor for the catalysts in this study. Temperature was kept constant at the indicated value between t1 and t2.

| Code | Run ID | $H_2$:CO | t1 (hr) | t2 (hr) | CO conv. t1 (%) | CO conv. t2 (%) | $CH_4$ sel. t1 (%) | $CH_4$ sel. t2 (%) | $C_{5+}$ sel. t1 (%) | $C_{5+}$ sel. t2 (%) | Temp (° C.) |
|---|---|---|---|---|---|---|---|---|---|---|---|
| 1310-23-015-4 | KP3005 | 1.85 | 136 | 191 | 76.3 | 75.4 | 5.7 | 5.6 | 89.6 | 89.9 | 208 |
| 1310-08-015-1 | KP3004 | 1.85 | 187 | 287 | 76.3 | 75.3 | 5.1 | 5.0 | 90.5 | 90.6 | 202.5 |
| 1101-05-003-1 | T1S1 10663 | 1.79 | 17428 | 17533 | 75.9 | 75.0 | 6.6 | 6.5 | 89.1 | 89.1 | 212 |
| 1303-04-003-1 | KP3001 | 1.79 | 292 | 392 | 75.6 | 74.9 | 5.9 | 5.8 | 88.9 | 89.2 | 208 |
| 1303-04-003-1 | T8S2B | 1.79 | 151 | 250 | 72.1 | 73.3 | 5.6 | 5.7 | 90.1 | 89.9 | 203.4 |
| 1303-04-003-1 | T8S8A | 1.79 | 150 | 249 | 75.7 | 75.5 | 5.5 | 5.5 | 90.2 | 90.3 | 204.6 |
| 1303-04-003-1 | LP1005 | 1.79 | 194 | 294 | 75.6 | 73.5 | 5.8 | 5.8 | 89.4 | 90.2 | 208 |
| 1303-04-003-1 | KP2001 | 1.79 | 273 | 359 | 75.8 | 77.3 | 7.2 | 6.6 | 86.5 | 87.9 | 206 |
| 1303-04-003-1 | T8S1 10707 | 1.85 | 717 | 818 | 76.9 | 76.3 | 6.3 | 6.3 | 89.0 | 89.0 | 205 |
| 1303-04-003-1 | KP2004 | 1.85 | 570 | 670 | 76.8 | 76.6 | 6.6 | 6.5 | 88.4 | 88.5 | 203 |
| 1209-20-003-1 | T8S2A 10648 | 1.79 | 215 | 306 | 76.1 | 75.5 | 6.1 | 6.1 | 88.4 | 88.5 | 207 |

TABLE 14

Individual FTS performance tests in the fixed bed reactor. In the fixed bed test, temperature is set at 205° C., t1 is 24 hrs t2 is 140 hrs, and the $H_2$:CO ratio is 2.

| Code | Run ID | CO conv. t1 (%) | CO conv. t2 (%) | $CH_4$ sel. t1 (%) | $CH_4$ sel. t2 (%) | $C_{5+}$ sel. t1 (%) | $C_{5+}$ sel. t2 (%) | Deactivation rate (%/day) |
|---|---|---|---|---|---|---|---|---|
| 1304-05-019-2 | 103 | 74.0 | 66.6 | 7.0 | 6.9 | 89.7 | 88.1 | −1.58 |
| 1304-05-019-2 | 100 | 79.8 | 72.9 | 7.0 | 7.4 | 90.5 | 88.0 | −1.43 |
| 1305-30-019-6 | 106 | 71.6 | 63.0 | 6.6 | 6.2 | 90.5 | 89.1 | −1.64 |
| 1306-26-015-2 | 107 | 71.9 | 66.0 | 6.3 | 6.5 | 90.8 | 88.4 | −1.36 |
| 1307-04-019-6 | 107 | 69.2 | 61.4 | 6.2 | 6.2 | 90.7 | 89.1 | −1.69 |
| 1301-04-015-1 | 93 | 73.5 | 66.9 | 6.5 | 6.5 | 90.7 | 88.6 | −1.41 |
| 1301-04-015-1 | 93 | 71.9 | 65.8 | 6.6 | 6.6 | 90.3 | 88.4 | −1.29 |
| 1301-04-015-1 | 115 | 67.8 | 62.6 | 6.8 | 6.7 | 89.6 | 88.2 | −1.15 |
| 1301-04-015-1 | 112 | 66.1 | 60.1 | 6.8 | 6.9 | 89.4 | 87.7 | −1.41 |
| 1301-04-015-1 | 110 | 67.8 | 62.5 | 6.9 | 6.9 | 89.7 | 88.0 | −1.25 |
| 1301-04-015-1 | 109 | 70.3 | 65.2 | 6.6 | 6.6 | 90.1 | 88.3 | −1.13 |
| 1301-04-015-1 | 95 | 71.0 | 64.6 | 6.9 | 7.0 | 90.1 | 88.0 | −1.32 |
| 1301-04-015-1 | 95 | 68.7 | 62.2 | 7.0 | 7.1 | 89.3 | 87.9 | −1.37 |
| 1301-04-015-1 | 109 | 71.0 | 66.0 | 6.4 | 6.6 | 91.4 | 88.5 | −1.35 |
| 1306-26-015-4 | 108 | 51.7 | 50.1 | 6.3 | 6.5 | 89.0 | 87.0 | −0.46 |
| 1308-09-015-1 | 110 | 72.1 | 68.1 | 7.0 | 7.0 | 90.0 | 87.9 | −0.97 |
| 1310-14-015-2 | 115 | 71.5 | 64.4 | 6.3 | 6.3 | 90.1 | 88.8 | −1.43 |
| 1310-23-015-4 | 116 | 65.8 | 57.7 | 7.0 | 6.8 | 88.8 | 88.0 | −1.72 |
| 1310-08-015-1 | 119 | 70.6 | 65.6 | 6.9 | 7.0 | 89.8 | 87.6 | −1.04 |
| 1303-04-003-1 | 115 | 75.7 | 71.2 | 8.4 | 8.2 | 87.5 | 86.2 | −1.02 |
| 1303-04-003-1 | 110 | 74.8 | 70.4 | 8.4 | 8.3 | 87.4 | 86.3 | −1.15 |
| 1303-04-003-1 | 105 | 73.0 | 69.0 | 8.3 | 7.7 | 87.6 | 87.1 | −0.86 |
| 1303-04-003-1 | 100 | 74.5 | 70.7 | 8.3 | 9.2 | 88.3 | 85.3 | −0.84 |
| 1207-09-003-2 | 96 | 69.1 | 68.0 | 7.7 | 7.7 | 89.2 | 87.3 | −0.53 |
| 1207-09-003-2 | 96 | 67.9 | 67.0 | 7.9 | 7.8 | 88.8 | 86.8 | −0.38 |
| 1209-20-003-1 | 96 | 62.2 | 62.8 | 7.7 | 7.6 | 88.7 | 86.6 | −0.05 |

Figure 12:
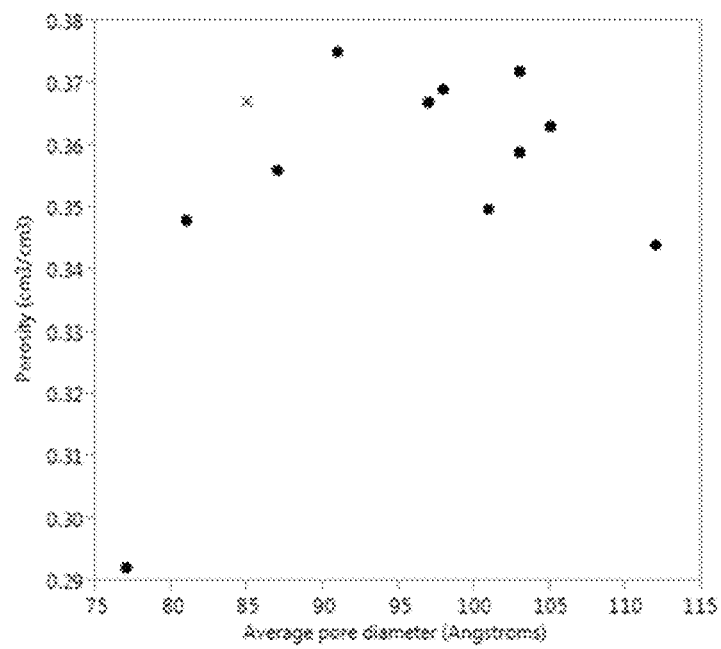
FIG. 12 is a plot of pore size versus porosity.
Figure 13:
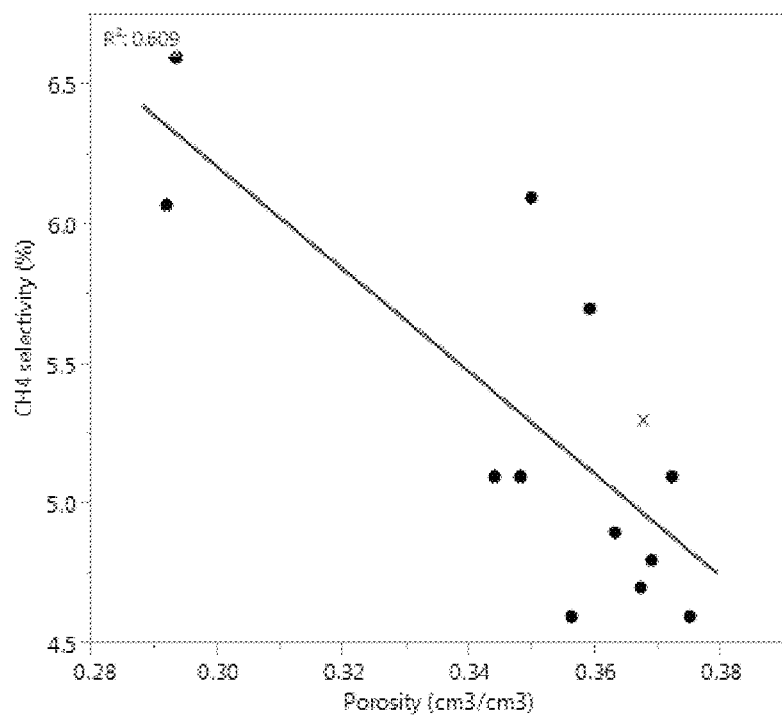
FIG. 13 illustrates the correlation between $CH_4$ selectivity and porosity.
Figure 14:
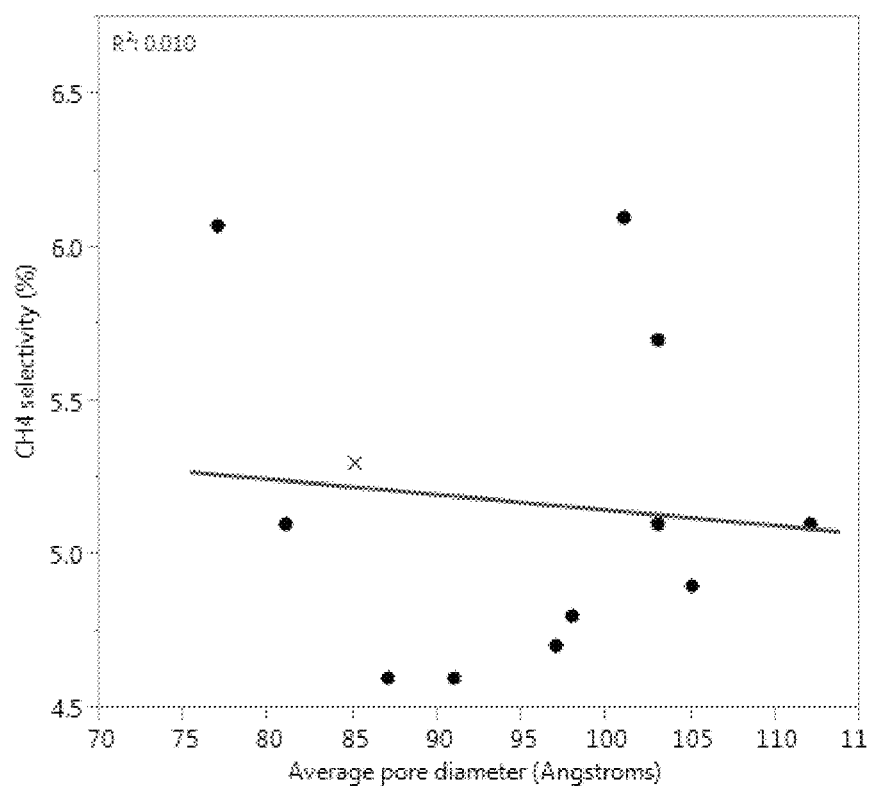
FIG. 14 illustrates the correlation between $CH_4$ selectivity and pore size

Pore size and porosity are two different properties. Increasing pore size does not necessarily increase porosity. See FIG. 12. Surprisingly, we discovered that porosity has a better relationship to selectivity than pore size does. The following two graphs illustrate that the relationship between $CH_4$ selectivity in a microchannel and porosity is quite strong (high $R^2$), whereas the correlation between selectivity and pore diameter (i.e., pore size) is almost non-existent ($R^2$ nearly zero). See FIGS. 13 and 14.

Method of Determining Average $Co_3O_4$ Particle Size and Size Distribution in FT Catalysts Via Powder X-Ray Diffraction In this invention, $Co_3O_4$ particle size is measured as follows:

X-ray diffraction patterns of fresh catalysts (e.g. post synthesis, but before reduction or use in FTS) were collected on a fully automated Siemens D5000 theta/theta powder diffractometer using Cu $K_\alpha$ radiation. Each sample was ground thoroughly before loading into a spinner carousel in air. Data were collected over the range 10-80° θ, with a step size of 0.05° and a step length of 12 s, and were analysed using the Rietveld method via the program GSAS. Likely crystalline phases were included until all peaks were indexed. The average $Co_3O_4$ crystallite size ($D_O$), and the c value of the $Co_3O_4$ crystallites were determined as described below.

The lattice parameters and phase fractions of all phases were refined first along with the background, which was fitted with a 16 term shifted Chebyshev polynomial. The sample shift was freely refined. As $Co_3O_4$ was the major phase in all calcined catalysts studied, this phase was analysed in detail. The oxygen atom position of the $Co_3O_4$ phase was first refined, along with the thermal parameters of all positions in this phase. The profile shape of the $Co_3O_4$ phase was then fitted with a Caglioti instrumental function (previously determined using a corundum standard) and a Lorentzian X and Y term were refined along with a Gaussian U and P contribution. The X, Y, U and P profile parameters of the $Co_3O_4$ phase were deconvoluted into their size and strain components using the methods described in Balzar et al. Journal of Applied Crystallography (2004), 37, 911-924 and Krill et al, Philosophical Magazine A (1998) 77, 620-640.

Explicitly, the X and P profile shape terms were used to determine the average crystallite size and the width of the distribution (assuming a lognormal, monomodal size distribution of spherical crystallites). First, the profile parameters were converted into integral breadths via $$\beta_{G,S} = \frac{\sqrt{2\pi^3 P}}{18000}$$

$$\beta_{L,S} = \frac{\pi^2 X}{2 \cdot 18000}$$

The Lorentzian and Gaussian integral breadths are then combined for the size (S) part:

$$\beta_S = \frac{\beta_{G,S} e^{-k_S^2}}{1 - \mathrm{erf}(k_S)}$$

where $$k_S = \frac{\beta_{L,S}}{\sqrt{\pi}\,\beta_{G,S}}$$

Once the separate peak shapes have been deconvoluted into the size component via this method, the volume-weighted ($L_V$, size distribution function weighted by the volume of the domains) and area-weighted ($L_A$, size distribution function weighted by the cross-sectional area of the domains) domain sizes may be determined through $$L_V = \frac{\lambda}{\beta_S}$$

and $$L_A = \frac{\lambda}{2\beta_{L,S}}$$

If the crystallites are assumed to be spheres, the area- and volume-weighted domain sizes can be related to the sphere diameters via $$D_V = 4/3 L_V \text{ and } D_A = 3/2 L_A$$

Finally, the volume and area weighted domain sizes are related to the dimensionless ratio c of the lognormal distribution and the numeric average particle radii $R_O$ by $$c = \frac{8L_V}{9L_A} - 1$$

and $$R_O = \frac{2L_V}{3(1+c)^3}$$

This explicitly assumes that the real particles are equivalent to the crystallites. The numeric average particle diameter ($D_O = 2R_O$) is thus related to the volume- and area-weighed diameters through $$D_V = D_O(1+c)^3 \text{ and } D_A = D_O(1+c)^2$$

The form of the distribution is:

$$f(R) = \frac{1}{R\sqrt{2\pi \ln(1+c)}} e^{-\frac{\left[\ln\left(\frac{R}{R_O}\sqrt{1+c}\right)\right]^2}{2\ln(1+c)}}$$

where $$c = \frac{\sigma^2}{R_O^2}$$

Where $R_O$ is the numeric average particle radius and c, which is known as the dimensionless ratio, characterises the width of the size distribution.

Porosity Measurement on FT Catalysts

Method

Total pore volume ($V_{Total}$) is calculated from a single point in the nitrogen physisorption isotherm near the saturation pressure, specifically at $P/P_O = 0.985$, at a temperature of 77 K. At this point, the internal pore structure of the catalyst contains condensed liquid nitrogen and the pore volume of the catalyst can be calculated via $$V_{Total} = \frac{V_{N2loaded}}{m_{sample}} \times \frac{1 \text{ mole}}{22{,}414 \text{ cm}^3 STP} \times \frac{M_W}{\rho}$$

where $M_w$ and ρ are the molecular weight and density of the probe molecule, $m_{sample}$ is the mass of the sample, and $V_{N2\ loaded}$ is the amount of nitrogen absorbed at this pressure. The molecular weight (Mw) and density (ρ) is 28.01 g/mol and 0.807 g/cm³ for $N_2$ absorbed at 77 K.

A Micromeritics Tristar 3020 unit was used for these measurements, although any commercial gas physisorption instrument operating on a static adsorption method could be used. Approximately 0.2 g of sample is loaded into a stemmed glass bulb and degassed by flowing nitrogen over the sample at 150° C. for two hours. This bulb is then transferred to the Tristar instrument, evacuated, and cooled in a liquid nitrogen bath. The sample is dosed with nitrogen gas up to the desired relative pressure of 0.985, and the loading of nitrogen gas determined. This is used to calculate total pore volume via the equation above.

The tap density of the catalyst is also determined. It can be measured using automated tap density analyzers (e.g. Autotap—Quantachrome Instruments, GeoPyc—Micromeritics Instrument Corporation). Specifically, in this study, the weight of an empty 5 mL cylinder was first measured. The catalyst sample was added to the measuring cylinder until it reaches the 5 mL mark. The weight of the filled cylinder was remeasured and securely fastened to the Autotap tap density machine. The volume was remeasured after 1,500 taps. The density was calculated by dividing the weight of catalyst in grams by the volume in mL after 1,500 taps.

Porosity is then calculated as the product of total pore volume and density, specifically:

$$\text{Porosity} = \rho \times V_{Total}$$

Results

The porosity for catalysts in this study is shown below

| Code | Description | ρ (g/mL) | Porosity (mL/mL) |
|---|---|---|---|
| 1304-05-019-2 | 4 step 46% Co 0.2% Re 0.03% Pt on 16% TiO$_2$/AGC Alkoxide | 1.08 | 0.369 |
| 1305-30-019-6 | 46% Co 0.03% P t0.2% Re on 4% B2O3/12% TiO2/AGC alkoxide 400° C. | 1.03 | 0.367 |
| 1306-26-015-2 | 43% Co (Lactic acid: Co 0.21) 0.03% Pt 0.2% Re on 12% TiO2/AGC (TALH + CA) | 1.02 | 0.372 |
| 1307-04-019-6 | 46% Co 0.03% Pt 0.2% Re on 16% TiO2/AGC alkoxide 400° C. | 1.06 | 0.363 |
| 1301-04-015-1 | 4-step [42% Co (CA: Co 0.2) 0.03% Pt 0.2% Re on 16% TiO2/AGC (TALH + CA)] | 1.10 | 0.379 |
| 1306-26-015-4 | 42% Co (CA: Co 0.2) 0.03% Pt 0.2% Re 1.4% Mn2O3 on 16% TiO2/AGC (TALH + CA) | 1.07 | 0.356 |
| 1308-09-015-1 | 42% Co(CA 0.2M) 0.2% Re 0.03% Pt 16% TiO2(PAMA, 1:1)/AGC - 4 step | 1.05 | 0.348 |
| 1310-14-015-2 | 42% Co 0.2% Re 0.03% Pt (CA: Co 0.2) on 10% TiO2 on AGC (PAMA 1:1) | 1.00 | 0.375 |
| 1310-23-015-4 | 45% Co 0.2% Re 0.03% Pt (CA: Co 0.2) on 16% TiO2 (PAMA:TiOiPr 1:1,) on AGC | 1.08 | 0.359 |
| 1310-08-015-1 | 45% Co 0.2% Re 0.03% Pt (Lactic acid: Co 0.21) on 11% TiO2/PD12058(PAMA 1:1) | 1.00 | 0.344 |
| 1101-05-003-1 | ActOCat 1100 [43% Co 0.2% Re 0.03% Pt on 16% TiO2/LC150 (via TiOiPr)] | 1.13 | 0.293 |
| 1303-04-003-1 | ActOCat 1200 [43% Co 0.2% Re 0.03% Pt on 16% TiO2/LC150 (TALH + CA)] | 1.13 | 0.289 |
| 1207-09-003-2 | ActOCat 1200, labscale, on PD12058 (PQ code 2583-95-10) | 1.11 | 0.326 |
| 1209-20-003-1 | ActOCat 1200, 10 kg, on PD12058 (PQ code 2583-126-6) | 1.04 | 0.350 |

What is claimed:

1. A composition, comprising:
    Co$_3$O$_4$, wherein the Co$_3$O$_4$ in the composition has an average particle size of at least 8.8 nm; and a secondary oxide; wherein the composition is in particulate form; and wherein the composition has a porosity of at least 0.35; wherein the composition is disposed in an atmosphere containing at least 1 mole % H$_2$.

2. The composition of claim 1 wherein the Co$_3$O$_4$ in the composition has an average particle size of at least 9.0 nm.

3. The composition of claim 1 wherein the composition has a porosity in the range of 0.36 to 0.39.

4. The composition of claim 1 having a propanol dehydration activity of at least 1.5×10$^{-5}$ moles propene per gram.

5. The composition of claim 1 wherein the secondary oxide comprises: Si, Ti, Al, Mg, Zr, Zn, Hf, Y, V, Mn, Cr, Mo, W, Ce, or combinations thereof.

6. The composition of claim 5 wherein the secondary oxide comprises Si and Ti.

7. The composition of claim 1 comprising at least 30 mass % Co.

8. The composition of claim 5 comprising at least 4 mass % TiO$_2$, wherein TiO$_2$ is determined by measuring the amount of Ti present in the composition and then assuming that all Ti is in the form of TiO$_2$.

9. The composition of claim 8 wherein the composition comprises a molar ratio of Si/Ti of at least 5.0.

10. The composition of claim 8 wherein the composition comprises a molar ratio of Si/Ti of up to 21.0.

11. A Fischer-Tropsch catalyst obtained by reducing the composition of claim 1.

12. A composition, comprising:
    Co$_3$O$_4$, wherein the Co$_3$O$_4$ in the composition has an average particle diameter of at least 8.8 nm; and a secondary oxide; where the composition is in particulate form and has a propanol dehydration activity of 1.5×10$^{-5}$ to 6×10$^{-5}$ moles propene desorbed per gram.

13. The composition of claim 1 where the secondary oxide comprises Si.

14. The composition of claim 1 wherein the composition has a porosity of up to 0.46.

15. The composition of claim 5 comprising a TiO$_2$ loading in the range of 4-8 mass %.

16. The composition of claim 14 wherein the Co$_3$O$_4$ in the composition has an average particle size of up to 15 nm.

17. The composition of claim 14 wherein the Co$_3$O$_4$ in the composition has an average particle size in the range of 9.4 to 10.9 nm.

18. The composition of claim 1 wherein the Co$_3$O$_4$ in the composition has an average particle size of up to 15 nm.

19. The composition of claim 1 wherein the Co$_3$O$_4$ in the composition has an average particle size in the range of 9.4 to 10.9 nm.

* * * * *